(12) United States Patent
Cheng et al.

(10) Patent No.: US 12,493,141 B2
(45) Date of Patent: Dec. 9, 2025

(54) CAMERA MODULE, IMAGING MODULE AND ELECTRONIC DEVICE

(71) Applicant: LARGAN PRECISION CO., LTD., Taichung (TW)

(72) Inventors: Jyun-Jia Cheng, Taichung (TW); Yu-Chen Lai, Taichung (TW); Ming-Ta Chou, Taichung (TW); Chen-Yi Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 657 days.

(21) Appl. No.: 17/815,279

(22) Filed: Jul. 27, 2022

(65) Prior Publication Data

US 2023/0060740 A1 Mar. 2, 2023

Related U.S. Application Data

(60) Provisional application No. 63/232,271, filed on Aug. 12, 2021.

(30) Foreign Application Priority Data

Jan. 13, 2022 (TW) ................................. 111101558

(51) Int. Cl.
*G02B 5/00* (2006.01)
*G02B 13/00* (2006.01)
*G03B 30/00* (2021.01)

(52) U.S. Cl.
CPC ......... *G02B 5/005* (2013.01); *G02B 13/0045* (2013.01); *G02B 13/0065* (2013.01); *G03B 30/00* (2021.01)

(58) Field of Classification Search
CPC .......................... G02B 5/005; G02B 13/0045; G02B 13/0065; G02B 5/003; G02B 7/026; G03B 30/00; G03B 11/00
(Continued)

(56) References Cited

U.S. PATENT DOCUMENTS 7,306,883 B2 12/2007 Ito
7,768,600 B2 8/2010 Kaihoko et al.
(Continued)

FOREIGN PATENT DOCUMENTS

CN 102472837 A 5/2012
CN 102483471 A 5/2012
(Continued)

*Primary Examiner* — Pinping Sun
*Assistant Examiner* — Alaina Marie Swanson
(74) *Attorney, Agent, or Firm* — McClure, Qualey & Rodack, LLP

(57) ABSTRACT

A camera module includes an imaging lens assembly and an image sensor. The imaging lens assembly includes a plastic optical element with a light-blocking layer disposed on its transparent surface. The plastic optical element includes an optical effective area, and a peripheral region of the light-blocking layer forms a specific shape around the optical effective area so as to define an aperture region. The peripheral region includes a main portion and a compensation portion. The main portion is physically contacted with the transparent surface. The compensation portion is disposed on an edge of the main portion adjacent to the optical effective area, and an optical density of the compensation portion is lower than an optical density of the main portion. The image sensor is disposed on an image side of the imaging lens assembly for defining a maximum image height and further defining a relative illumination.

12 Claims, 39 Drawing Sheets

(58) Field of Classification Search
USPC .......................................................... 359/17
See application file for complete search history.

(56) References Cited

U.S. PATENT DOCUMENTS

| | | |
|---|---|---|
| 8,102,609 B2 | 1/2012 | Tsuchiya et al. |
| 8,422,138 B2 | 4/2013 | Ovrutsky et al. |
| 8,958,155 B2 | 2/2015 | Kubota |
| 9,207,364 B2 | 12/2015 | Yang et al. |

FOREIGN PATENT DOCUMENTS

| | | | | |
|---|---|---|---|---|
| CN | 103460683 A | | 12/2013 | |
| CN | 204389721 U | | 6/2015 | |
| CN | 105190390 A | | 12/2015 | |
| CN | 207924229 U | | 9/2018 | |
| CN | 110187463 A | * | 8/2019 | .............. G02B 7/09 |
| CN | 211826845 U | | 10/2020 | |
| CN | 202112933 A | | 4/2021 | |
| CN | 109283656 B | * | 6/2021 | ............ H04N 23/55 |
| TW | 201809868 A | | 3/2018 | |
| TW | I696858 B | | 6/2020 | |
| TW | 202113424 A | | 4/2021 | |

* cited by examiner

CAMERA MODULE, IMAGING MODULE AND ELECTRONIC DEVICE

RELATED APPLICATIONS

This application claims priority to U.S. Provisional Application Ser. No. 63/232,271, filed Aug. 12, 2021 and Taiwan Application Serial Number 111101558, filed Jan. 13, 2022, which are herein incorporated by reference.

BACKGROUND

Technical Field

The present disclosure relates to a camera module and an imaging module. More particularly, the present disclosure relates to a camera module and an imaging module applicable to portable electronic devices.

Description of Related Art

In recent years, portable electronic devices have developed rapidly. For example, intelligent electronic devices and tablets have been filled in the lives of modern people, and camera modules and imaging modules thereof mounted on portable electronic devices have also prospered. However, as semiconductor technology advances, both the light sensitivity and resolution of the image sensor are dramatically upgraded, and thus defects occurred in a light-blocking layer of imaging lens assemblies have been an issue to be reckoned with.

In the conventional art, the light-shielding effect is achieved by excessive shading from the light-blocking layer, so that the optical quality of peripheral region is sacrificed and the relative illuminance is reduced, and a conventional light-blocking layer is unable to be formed into a specific shape within micro-scale range.

Furthermore, if there is any defect existing in the peripheral region of the light-blocking layer, unexpected light which should be blocked previously will pass through the light-blocking layer, and the optical quality will reduce. The reason for occurring the defect could be a random fault happened during the layer formation or a technical limitation from unreachable micro-scale range. Furthermore, a light-shielding quality is depended on the uniformity of a thickness of the light-blocking layer, when light passes through a thinner part of the light-blocking layer, a noise in an image sensor formed by the light will be difficult to be removed. Owning to the advances in electronic technology, the image sensor is available to obtain light with lower illumination, so that the camera modules still work in the darker environment. But once an optical density of the light-blocking layer is not enough, light will still pass through the light-blocking layer and be received by the image sensor, and noise will be formed then.

FIGS. 8A to 8F are schematic views of a light-blocking layer 860 in the prior arts. In FIGS. 8A to 8F, the light-blocking layer 860 in the prior art is usually used to control a light path for eliminating light speckles and flares. However, when an incident light is too strong, a stray light is generated on an edge of the light-blocking layer 860 and affects an optical quality, which is resulted from the defects P, P1, P2, P2' and P3 existing in the light-blocking layer 860. The defects P, P1, P2, P2' and P3 can be discussed in three parts. First, the defects exist on the edge of the light-blocking layer 860; second, light-blocking layer 860 is coated unevenly; and third, an optical density of the light-blocking layer 860 is insufficient. Particularly, the defects P, P1 exist on a peripheral region (its reference numeral is omitted) of the light-blocking layer 860, which is a main portion 862 of the peripheral region, and the defects P, P1 might be caused by an excessive roughness of a surface of the light-blocking layer 860, but the reason is not limited thereto. More specifically, the main portion 862 and a transparent surface 871 of a plastic optical element (not shown) are physically contacted. The defect P2 can be resulted from an uneven optical density of the light-blocking layer 860. A formation of the defect P2 may be affected by a surface tension, that is, the light-blocking layer 860 be accumulated on the edge, or aggregation caused by depression and protrusion on the surface of the light-blocking layer 860, but the reason is not limited thereto. Furthermore, the defect P2 could further cause the optical density of the peripheral light-blocking layer 860 being insufficient so that the defect P2' is formed. The defect P3 is contributed by a height difference of the surface when the optical density of the light-blocking layer 860 is insufficient, but it is not limited thereto.

Therefore, a camera module and an imaging module, having a precisely controllable light-blocking layer, need to be developed.

SUMMARY

According to one aspect of the present disclosure, a camera module includes an imaging lens assembly and an image sensor. The imaging lens assembly includes a plastic optical element. A light-blocking layer is disposed on a transparent surface of the plastic optical element. The plastic optical element includes an optical effective area. A peripheral region of the light-blocking layer forms a specific shape around the optical effective area so as to define an aperture region by the light-blocking layer, and the aperture region corresponds to the optical effective area. The peripheral region includes a main portion and a compensation portion. The main portion is physically contacted with the transparent surface. The compensation portion is disposed on an edge of the main portion adjacent to the optical effective area, wherein the compensation portion is closer to the optical effective area than the main portion to the optical effective area. The compensation portion extends toward a direction close to the optical effective area, and an optical density of the compensation portion is lower than an optical density of the main portion. The image sensor is disposed on an image side of the imaging lens assembly for defining a maximum image height, and the imaging lens assembly corresponds to the maximum image height for defining a relative illumination. A roughness of the transparent surface is RO, which is equal to or less than 1.2 µm. The transparent surface includes an annular marked structure, the annular marked structure has an angle end, and the angle end surrounds the optical effective area. When the relative illumination of the imaging lens assembly is RI, the optical density of the main portion is DM, a thickness of the main portion is T, and an extension distance of the compensation portion is L, the following conditions are satisfied: $-\mathrm{LOG}(\mathrm{RI})/\mathrm{DM} \leq 1.2$; $3 \text{ degrees} \leq \tan^{-1}(T/L) \leq 89.5 \text{ degrees}$; $0.7 \text{ µm}^{-1} \leq \mathrm{DM}/T \leq 7.2 \text{ µm}^{-1}$, and $0 \text{ µm} < L \leq 32 \text{ µm}$.

According to one aspect of the present disclosure, an electronic device includes at least one of the camera modules of the aforementioned aspect.

According to one aspect of the present disclosure, a camera module includes an imaging lens assembly and an image sensor. The imaging lens assembly includes a plastic optical element. A light-blocking layer is disposed on a transparent surface of the plastic optical element. The plastic optical element includes an optical effective area, and a peripheral region of the light-blocking layer forms a specific shape around the optical effective area so as to define an aperture region by the light-blocking layer, and the aperture region corresponds to the optical effective area. The peripheral region includes a main portion and a compensation portion. The main portion is physically contacted with the transparent surface. The compensation portion is disposed on an edge of the main portion adjacent to the optical effective area, wherein the compensation portion is closer to the optical effective area than the main portion to the optical effective area. The compensation portion extends toward a direction close to the optical effective area, and an optical density of the compensation portion is lower than an optical density of the main portion. The image sensor is disposed on an image side of the imaging lens assembly for defining a maximum image height, and the imaging lens assembly corresponds to the maximum image height for defining a relative illumination. A roughness of the transparent surface is RO, which is equal to or less than 1.2 μm. The transparent surface includes an annular marked structure, the annular marked structure has an angle end, and the angle end surrounds the optical effective area. When the relative illumination of the imaging lens assembly is RI, the optical density of the main portion is DM, a thickness of the main portion is T, a maximum extension distance of the compensation portion is Lmax, and an area of the compensation portion is A, the following conditions are satisfied: $-\text{LOG}(\text{RI})/\text{DM} \le 1.2$; $0.7\ \mu\text{m}^{-1} \le \text{DM}/\text{T} \le 7.2\ \mu\text{m}^{-1}$, $0\ \mu\text{m} < \text{Lmax} \le 32\ \mu\text{m}$; and $0 < \text{Lmax}/\sqrt{(A)} \le 0.98$.

According to one aspect of the present disclosure, an electronic device includes at least one of the camera modules of the aforementioned aspect.

According to one aspect of the present disclosure, a camera module includes an imaging lens assembly and an image sensor. The imaging lens assembly includes a plastic optical element, and a light-blocking layer is disposed on a transparent surface of the plastic optical element. The plastic optical element includes an optical effective area, and a peripheral region of the light-blocking layer forms a specific shape around the optical effective area so as to define an aperture region by the light-blocking layer, the aperture region corresponds to the optical effective area. The peripheral region includes a main portion and a compensation portion. The main portion is physically contacted with the transparent surface. The compensation portion is disposed on an edge of the main portion adjacent to the optical effective area, wherein the compensation portion is closer to the optical effective area than the main portion to the optical effective area. The compensation portion extends toward a direction close to the optical effective area, and an optical density of the compensation portion is lower than an optical density of the main portion. The compensation portion includes a projecting end and a reverse tilting surface. The projecting end is disposed on an end away from the main portion. The reverse tilting surface faces toward the transparent surface. The reverse tilting surface approaches the transparent surface along a direction from the projecting end close to the main portion, and an air space is formed between the reverse tilting surface and the transparent surface. The image sensor is disposed on an image side of the imaging lens assembly for defining a maximum image height, and the imaging lens assembly corresponds to the maximum image height for defining a relative illumination. A roughness of the transparent surface is RO, which is equal to or less than 1.2 μm. The transparent surface includes an annular marked structure, the annular marked structure has an angle end, and the angle end surrounds the optical effective area. When the relative illumination of the imaging lens assembly is RI, the optical density of the main portion is DM, a thickness of the main portion is T, and an extension distance of the compensation portion is L, the following conditions are satisfied: $-\text{LOG}(\text{RI})/\text{DM} \le 1.2$; $3\ \text{degrees} \le \tan^{-1}(\text{T}/\text{L}) \le 89.5\ \text{degrees}$; and $0\ \mu\text{m} < \text{L} \le 32\ \mu\text{m}$.

According to one aspect of the present disclosure, an electronic device includes at least one of the camera modules of the aforementioned aspect.

According to one aspect of the present disclosure, a camera module includes an imaging lens assembly and an image sensor. The imaging lens assembly includes a plastic optical element. A light-blocking layer is disposed on a transparent surface of the plastic optical element. The plastic optical element includes an optical effective area. A peripheral region of the light-blocking layer forms a specific shape around the optical effective area so as to define an aperture region by the light-blocking layer, and the aperture region corresponding to the optical effective area. The peripheral region includes a main portion forming the specific shape. The image sensor is disposed on an image side of the imaging lens assembly for defining a maximum image height, and the imaging lens assembly corresponds to the maximum image height for defining a relative illumination and a half field of view. A roughness of the transparent surface is RO, which is equal to or less than 1.2 μm. The transparent surface includes an annular marked structure, the annular marked structure has an angle end, and the angle end surrounds the optical effective area. When a thickness of the main portion is T, an optical density of the main portion is DM, the relative illumination of the imaging lens assembly is RI, and the half field of view is HFOV, the following conditions are satisfied: $-\text{LOG}(\text{RI})/\text{DM} \le 1.2$; $0.14\ \mu\text{m} \le \text{T} \le 9.85\ \mu\text{m}$; $0.7\ \mu\text{m}^{-1} \le \text{DM}/\text{T} \le 7.2\ \mu\text{m}^{-1}$, and $0.04 \le \text{RI} \times \sin(\text{HFOV}) \le 0.35$.

According to one aspect of the present disclosure, an electronic device includes at least one of the camera modules of the aforementioned aspect.

According to one aspect of the present disclosure, an imaging module includes a lens assembly and an image source, wherein the image source is disposed on an incident side of the lens assembly. The lens assembly includes a glass lens element and a plastic lens element. The glass lens element is closer to the image source than the plastic lens element to the image source. A light-blocking layer is disposed on a transparent surface of the plastic lens element, and the plastic lens element includes an optical effective area. A peripheral region of the light-blocking layer forms a specific shape around the optical effective area so as to define an aperture region by the light-blocking layer, and the aperture region corresponds to the optical effective area. A roughness of the transparent surface is RO, which is equal to or less than 1.2 μm. The transparent surface includes an annular marked structure, the annular marked structure has an angle end, and the angle end surrounds the optical effective area. The peripheral region includes a main portion forming the specific shape. When a thickness of the main portion is T, and an optical density of the main portion is DM, the following conditions are satisfied: $0.14\ \mu\text{m} \le \text{T} \le 9.85\ \mu\text{m}$; and $0.7\ \mu\text{m}^{-1} \le \text{DM}/\text{T} \le 7.2\ \mu\text{m}^{-1}$.

According to one aspect of the present disclosure, an electronic device includes at least one of the imaging modules of the aforementioned aspect.

According to one aspect of the present disclosure, an imaging module includes a lens assembly and an image source. The lens assembly includes, in order from an incident side to an exit side, a reflective element and a plastic lens element. The image source is disposed on the incident side of the lens assembly. A light-blocking layer is disposed on a transparent surface of the plastic lens element, and the plastic lens element includes an optical effective area. A peripheral region of the light-blocking layer forms a specific shape around the optical effective area so as to define an aperture region by the light-blocking layer, and the aperture region corresponds to the optical effective area. A roughness of the transparent surface is RO, which is equal to or less than 1.2 μm. The transparent surface includes an annular marked structure, the annular marked structure has an angle end, and the angle end surrounds the optical effective area. The peripheral region includes a main portion forming the specific shape. When a thickness of the main portion is T, and an optical density of the main portion is DM, the following conditions are satisfied: 0.14 μm≤T≤9.85 μm; and 0.7 μm$^{-1}$≤DM/T≤7.2 μm$^{-1}$.

According to one aspect of the present disclosure, an electronic device includes at least one of the imaging modules of the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
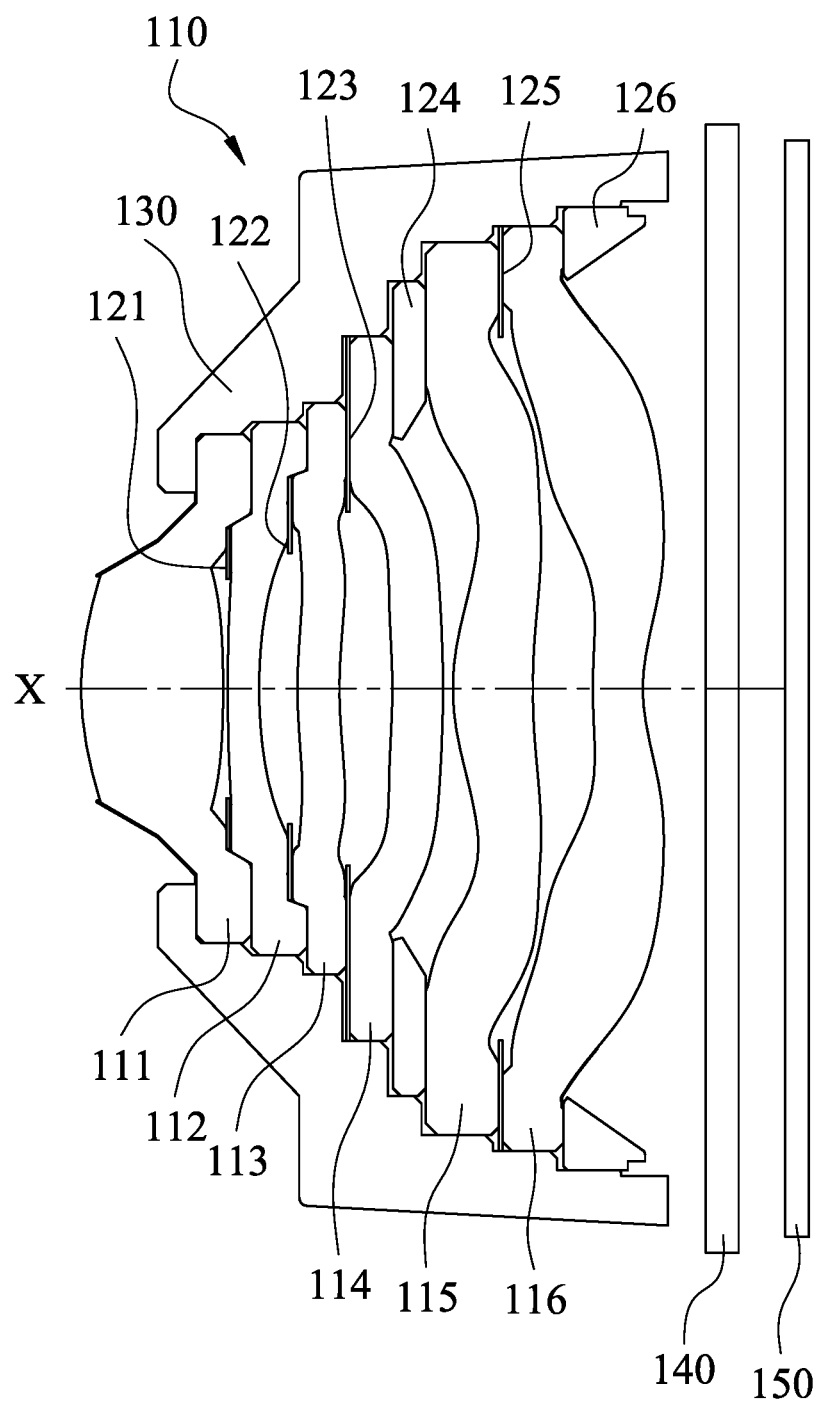
FIG. 1A is a schematic view of a camera module according to the 1st embodiment of the present disclosure.

The present disclosure provides a camera module, which includes an imaging lens assembly and an image sensor. The imaging lens assembly includes a plastic optical element, wherein a light-blocking layer is disposed on a transparent surface of the plastic optical element, and the plastic optical element includes an optical effective area. Furthermore, a peripheral region of the light-blocking layer forms a specific shape around the optical effective area so as to define an aperture region by the light-blocking layer, and the aperture region corresponds to the optical effective area. The peripheral region includes a main portion, and the main portion can be physically contacted with the transparent surface, and the main portion can form a specific shape. The image sensor is disposed on an image side of the imaging lens assembly for defining a maximum image height, and the imaging lens assembly corresponds to the maximum image height for defining a relative illumination. A roughness of the transparent surface is RO, which is equal to or less than 1.2 μm. The transparent surface includes an annular marked structure, the annular marked structure has an angle end, and the angle end surrounds the optical effective area. When the relative illumination of the imaging lens assembly is RI, and the optical density of the main portion is DM, the following condition can be satisfied: $-\text{LOG}(RI)/DM \leq 1.2$. When $-\text{LOG}(RI)/DM \leq 1.2$ is satisfied, the optical density of the light-blocking layer is sufficient for the imaging lens assembly.

In detail, the angle end of the annular marked structure can surround the optical effective area integrally, and the annular marked structure can be an alignment mark during coating the light-blocking layer and assembling the optical effective area, and also can be a benchmark for inspecting the optical effective area offset or an alignment mark for assembling, but it is not limited thereto. Therefore, the overall optical quality of the imaging lens assembly can be improved. Moreover, the annular marked structure can further correspond to the demolding direction of the plastic injection mold, which leads to the integral molding of the annular marked structure on the plastic optical element, so that the relative position of the annular marked structure and the other elements can be ensured.

The relative illumination is to describe the intensity ratio of the peripheral light and the central light when light passes through the imaging lens element and converges on the image side, and the ratio is between 0 and 1. In detail, the intensity ratio of the peripheral light and the central light can be more than 0.1, and can further be more than 0.2. Particularly, the relative illumination corresponds to the maximum image height of the image sensor. When the image sensor is rectangle, the maximum image height can be defined as the half diagonal length of the image sensor; and when the image sensor is non-rectangle, the maximum image height can be defined as the radius of the minimum circumscribed circle of the image sensor.

The optical density is the shielding strength for visible light (in general, the visible light can be defined from 400 nm to 700 nm, or from 380 nm to 720 nm, but it is not limited thereto). The light-blocking layer can provide an optical density more than or equal to 1.0 and less than or equal to 9.0, but it is not limited thereto.

The specific shape is an unexpected shape formed in the peripheral region of the light-blocking layer in the micro-scale range, and the specific shape is controllable under the micro-scale.

The peripheral region can further include a compensation portion, which is disposed on an edge of the main portion adjacent to the optical effective area. The compensation portion is closer to the optical effective area than the main portion to the optical effective area, the compensation portion extends toward a direction close to the optical effective area, and an optical density of the compensation portion is lower than an optical density of the main portion. Particularly, the compensation portion has the function of pre-compensation, which can eliminate the random defects that may occur in the main portion and make the peripheral region achieve a much better roundness, so that the light-shielding function of the light-blocking layer can be ensured.

The compensation portion can include a projecting end and a reverse tilting surface, the projecting end is disposed on an end away from the main portion, and the reverse tilting surface faces toward the transparent surface. The reverse tilting surface approaches the transparent surface along a direction from the projecting end close to the main portion, and an air space is formed between the reverse tilting surface and the transparent surface. Therefore, an optical trap structure between the compensation portion and the plastic optical element are formed so as to reduce the generation of stray light.

The plastic optical element can be a plastic lens element, the plastic lens element includes an aspheric surface, and the aspheric surface corresponds to the optical effective area. Or the plastic optical element can be a plastic reflective element, the plastic reflective element includes at least one reflective surface, and the at least one reflective surface and the optical effective area are disposed on the same light path.

When a thickness of the main portion is T, and an extension distance of the compensation portion is L, the following condition can be satisfied: $3 \text{ degrees} \leq \tan^{-1}(T/L) \leq 89.5 \text{ degrees}$. When $3 \text{ degrees} \leq \tan^{-1}(T/L) \leq 89.5 \text{ degrees}$ is satisfied, the size of the compensation portion can be well controllable so as to improve yield.

When the optical density of the main portion is DM, and the thickness of the main portion is T, the following condition can be satisfied: $0.7 \text{ μm}^{-1} \leq DM/T \leq 7.2 \text{ μm}^{-1}$. When $0.7 \text{ μm}^{-1} \leq DM/T \leq 7.2 \text{ μm}^{-1}$ is satisfied, the thickness of the light-blocking layer can be reduced once the main portion is equipped with sufficient light-shielding function, and further improve the thickness uniformity. Moreover, the following condition can be satisfied: $1.6 \text{ μm}^{-1} \leq DM/T \leq 1.95 \text{ μm}^{-1}$.

When the extension distance of the compensation portion is L, the following condition can be satisfied: 0 µm<L≤32 µm. When 0 µm<L≤32 µm is satisfied, molding of the compensation portion can be ensured so as to prevent pollution from stripping. Furthermore, the following condition can be satisfied: 0 µm<L≤16 µm. Moreover, the following condition can be satisfied: 0 µm<L≤7 µm.

When a maximum extension distance of the compensation portion is Lmax, the following condition can be satisfied: 0 µm<Lmax≤32 µm. When 0 µm<Lmax≤32 µm is satisfied, molding of the compensation portion can be further ensured. Furthermore, the following condition can be satisfied: 0 µm<Lmax≤16 µm. Moreover, the following condition can be satisfied: 0 µm<Lmax≤7 µm.

When the maximum extension distance of the compensation portion is Lmax, and an area of the compensation portion is A, the following condition can be satisfied: 0<Lmax/√(A)≤0.98. When 0<Lmax/√(A)≤0.98 is satisfied, molding of the compensation portion can be ensured so as to prevent pollution from stripping. Furthermore, the following condition can be satisfied: 0.05≤Lmax/√(A)≤0.9. Moreover, the following condition can be satisfied: 0.1≤Lmax/√(A)≤0.8.

The imaging lens assembly corresponds to the maximum image height is for defining a half field of view, when the half field of view is HFOV, and the relative illumination of the imaging lens assembly is RI, the following condition can be satisfied: 0.04≤RI×sin(HFOV)≤0.35. When 0.04 RI×sin(HFOV)≤0.35 is satisfied, the accuracy of the light-blocking has a significant impact on the optical quality. Furthermore, the following condition can be satisfied: 0.05≤RI×sin(HFOV)≤0.3. Moreover, the following condition can be satisfied: 0.1≤RI×sin(HFOV)≤0.2.

When the thickness of the main portion is T, the following condition can be satisfied: 0.14 µm≤T≤9.85 µm. With a sufficiently thin thickness, the light-blocking layer can be prevented from accumulation during molding so as to improve the thickness uniformity of the light-blocking layer. Furthermore, the following condition can be satisfied: 0.28 µm≤T≤4.95 µm. Moreover, the following condition can be satisfied: 0.48 µm≤T≤1.95 µm.

When the roughness of the transparent surface is RO, and a roughness of the main portion is RM, the following condition can be satisfied: 0≤|1−RO/RM|≤0.6. When 0≤|1−RO/RM|≤0.6 is satisfied, the thickness uniformity can be further controlled. It should be noted that, in the present disclosure, the roughness of the transparent surface RO and the roughness of the main portion RM are both measured by Ra as the statistical method.

When the thickness of the main portion is T, and the maximum extension distance of the compensation portion is Lmax, the following condition can be satisfied: 3 degrees≤tan$^{-1}$(T/Lmax)≤89.5 degrees. When 3 degrees≤tan$^{-1}$(T/Lmax)≤89.5 degrees is satisfied, the light-shielding function of the light-blocking layer can be further ensured.

Each of the aforementioned features of the camera module can be utilized in various combinations for achieving the corresponding effects.

The present disclosure provides an electronic device, which includes at least one of the aforementioned camera modules.

The present disclosure provides an image module, which includes a lens assembly and an image source. The lens assembly includes a plastic lens element, and the image source is disposed on an incident side of the lens assembly. A light-blocking layer is disposed on a transparent surface of the plastic lens element, and the plastic lens element includes an optical effective area. A peripheral region of the light-blocking layer forms a specific shape around the optical effective area so as to define an aperture region by the light-blocking layer, and the aperture region corresponds to the optical effective area. A roughness of the transparent surface is RO, which is equal to or less than 1.2 µm. The transparent surface includes an annular marked structure, the annular marked structure has an angle end, and the angle end surrounds the optical effective area. The peripheral region includes a main portion so as to form the specific shape. When a thickness of the main portion is T, and an optical density of the main portion is DM, the following conditions are satisfied: 0.14 µm≤T≤9.85 µm and 0.7 µm$^{-1}$≤DM/T≤7.2 µm$^{-1}$.

In particular, the image module can be a lens assembly or multiple lens assemblies, which depends on the incident light from the image source being converged or diverged when entering the lens assembly.

The image source can be a liquid crystal display (LCD), a digital light processing (DLP), a laser light source, an ultraviolet light source, or an infrared light source, and the image source can further include an image transmission module and some optical elements, such as a lens array, an optical diffuser, or a glass slide, and the image transmission module can be a waveguide or an optical path folding lens assembly, but the present disclosure is not limited thereto.

The lens assembly can further include a glass lens element, and the glass lens element is closer to the image source than the plastic lens element to the image source. Therefore, the impact of waste heat from image source on the optical quality of the plastic lens element can be minimized, so that the optical quality of the lens assembly can be ensured.

The lens assembly can further include a reflective element. In detail, the lens assembly includes a reflective element and a plastic lens element from an incident side to an exit side respectively. The overall height of the image module can be reduced via the reflective element, which makes the image module favorable for miniaturization and further applies to head-mounted devices, but the present disclosure is not limited thereto.

The optical effective area of the transparent surface can be an aspheric surface, and the aspheric surface includes at least one inflection point.

When the optical density of the main portion is DM, and a thickness of the main portion is T, the following condition can be satisfied: 1.6 µm$^{-1}$≤DM/T≤1.95 µm$^{-1}$.

When the roughness of the transparent surface is RO, and a roughness of the main portion is RM, the following condition can be satisfied: 0≤|1−RO/RM|≤0.6.

Each of the aforementioned features of the image module can be utilized in various combinations for achieving the corresponding effects.

The present disclosure provides an electronic device, which includes at least one of the aforementioned image modules.

Overall, according to the camera modules and the image modules in the present disclosure, the thickness uniformity of the light-blocking layer can be improved, the surface roughness of the transparent surface physically contacted with the light-blocking layer is lower, and the uneven thickness issue of the light-blocking layer can be prevented, thereby reducing the risk of light penetrating through the light-blocking layer. Furthermore, the surface roughness of the light-blocking layer can be lower as well, thereby further assuring the thickness uniformity of the light-blocking layer. Moreover, thinner light-blocking layer can overcome the aggregation of the light-blocking layer, and further improve the thickness uniformity of the light-blocking layer.

Moreover, the light-blocking layer is equipped with an outstanding optical density. Furthermore, when the optical density of the main portion is O.D., and the thickness of the main portion is T, the following conditions are satisfied: 1.0≤O.D.≤9; and 0.14 μm≤T≤9.85 μm. Under the conditions above, an intensity of the light passing through the light-blocking layer is I(out), an intensity of the light entering the light-blocking layer is I(in), and thus O.D. is defined as −log(I(out)/I(in)).

In particular, there are the measure methods of optical density as described below.

First, embedding the plastic optical element with the light-blocking layer into a transparent plastic as a quasi-experimental object.

Second, arranging an incident surface and an exiting surface on the quasi-experimental object so that light beam can sequentially pass through the incident surface, the light-blocking layer, and the exiting surface. The incident surface and the exiting surface can be processed with indispensable cutting, grinding, and polishing so as to form an experimental object. General speaking, the incident surface and the exiting surface are parallel and both their surface roughness are less than 0.5 μm. It should be noted that the roughness aforementioned are measured by Ra as the statistical method. Under appropriate conditions, the light-blocking layer can be exposed beyond the incident surface, meanwhile, the light beam enters the incident surface and then passes through the exiting surface. The appropriate condition above-mentioned can be a flat and large enough light-blocking layer.

Third, preparing a control object molding by the aforementioned plastic, which has the similar configuration and surface morphology with the experimental object but without embedding optical element.

Forth, disposing the control object between a light-emitting end and a receiving end, and scan the control object beyond visible light spectrum (400 nm-700 nm), the scanning intervals can be 1 nm, 5 nm, 10 nm, or 0.5 nm, 0.1 nm, but it is not limited thereto. Light beam passes through the incident surface and the exiting surface sequentially, and then the receiving end receives an intensity information of the light beam and further obtains an average I(in) of the intensity information aforementioned.

Fifth, disposing the experimental object between the light-emitting end and the receiving end, and scan the control object beyond visible light spectrum (400 nm-700 nm), the scanning intervals can be 1 nm, 5 nm, 10 nm, or 0.5 nm, 0.1 nm, but it is not limited thereto. The light beam passes through the incident surface, the light-blocking layer, and the exiting surface sequentially, and then the receiving end receives an intensity information of the light beam and further obtains an average I(out) of the intensity information aforementioned.

Sixth, calculating I(in) and I(out) and then obtain a value of the optical density (O.D.).

According to the aforementioned features, the light-blocking layer in the present disclosure is more precisely controllable than the light-blocking layer in the prior art. The precise control above-mentioned is for describing that the traits of the light-blocking layer are controllable in microscale, including light-shielding coverage, thickness, uniformity, and so forth.

Table 1 is the experimental data of the light-blocking layer according to the present disclosure, wherein a number of the plastic lens elements of the lens assembly is N, a maximum image height of the lens assembly is ImgH, a relative illumination of the lens assembly is RI, and a half field of view of the lens assembly is HFOV. It should be noted that the light-blocking layer is coated onto at least one of the N plastic lens elements, sample 01-sample 35 and sample 37-sample 39 are examples of the present disclosure, and sample 36 is the control object. According to Table 1, except for sample 36, the stray light performances of other samples are sensitive to the dimensional accuracy of the light-blocking layer and show excellent relative illuminance and half field of view. It should be noted that sample 36 does not show significant effect on controlling the stray light because sample 36 has a higher relative illumination than the other lens assemblies with the half field of view more than 60 degrees (such as sample 04 and sample 05), so that the lens assembly of sample 36 shows a lower negative effect on the relative illumination under excessive light-shielding condition than the other samples.

TABLE 1

| Sample | N | ImgH (mm) | RI (%) | HFOV (degrees) | RI × sin(HFOV) (%) |
|---|---|---|---|---|---|
| 01 | 7 | 6.00 | 19.1 | 42.65 | 12.94 |
| 02 | 7 | 4.615 | 24.8 | 37.75 | 15.18 |
| 03 | 7 | 4.636 | 27.7 | 40.5 | 17.99 |
| 04 | 6 | 2.52 | 12.9 | 62.5 | 11.44 |
| 05 | 5 | 2.52 | 14.0 | 62.45 | 12.41 |
| 06 | 7 | 5.12 | 24.1 | 42.5 | 16.28 |
| 07 | 7 | 3.131 | 24.1 | 65.75 | 21.97 |
| 08 | 6 | 2.87 | 33.2 | 65.85 | 30.29 |
| 09 | 8 | 7.15 | 22.1 | 42.5 | 14.93 |
| 10 | 9 | 4.00 | 64.6 | 16.15 | 17.97 |
| 11 | 9 | 4.00 | 83.9 | 12.3 | 17.87 |
| 12 | 9 | 4.00 | 90.6 | 9.85 | 15.50 |
| 13 | 9 | 8.166 | 20.0 | 42.5 | 13.51 |
| 14 | 8 | 8.166 | 17.3 | 46 | 12.44 |
| 15 | 8 | 8.166 | 21 | 42.65 | 14.23 |
| 16 | 8 | 7.145 | 24.7 | 42.5 | 16.69 |
| 17 | 7 | 5.12 | 13.8 | 59.9 | 11.94 |
| 18 | 7 | 6.53 | 22.9 | 42.75 | 15.54 |
| 19 | 7 | 4.626 | 17.5 | 52.45 | 13.87 |
| 20 | 7 | 6.00 | 26 | 40.6 | 16.92 |
| 21 | 6 | 4.8 | 23.5 | 41.75 | 15.65 |
| 22 | 7 | 4.00 | 16.4 | 61.1 | 14.36 |
| 23 | 6 | 4.8 | 27.9 | 40.25 | 18.03 |
| 24 | 7 | 5.161 | 22.8 | 41.5 | 15.11 |
| 25 | 7 | 5.161 | 23.3 | 41.55 | 15.45 |
| 26 | 6 | 3.24 | 26.8 | 80.1 | 26.40 |
| 27 | 5 | 3.269 | 38.3 | 24.4 | 15.82 |
| 28 | 5 | 3.269 | 38.2 | 24.3 | 15.72 |
| 29 | 5 | 2.87 | 20.6 | 44.25 | 14.37 |
| 30 | 5 | 2.911 | 30.2 | 36.85 | 18.11 |
| 31 | 5 | 2.502 | 61 | 9.75 | 10.33 |
| 32 | 7 | 6.1488 | 23.3 | 41.525 | 15.45 |
| 33 | 7 | 4.788 | 24.5 | 39.5 | 15.58 |
| 34 | 7 | 3.528 | 25.8 | 39.35 | 16.36 |
| 35 | 5 | 2.52 | 28.8 | 42.39 | 19.42 |
| 36 | 5 | 1.92 | 61.7 | 62.4 | 54.7 |
| 37 | 6 | 2.52 | 59.6 | 22.43 | 22.74 |
| 38 | 6 | 2.52 | 66.3 | 18.38 | 20.91 |
| 39 | 3 | 2.502 | 98.1 | 5.05 | 8.64 |

According to the aforementioned embodiment, specific examples are provided, and illustrated via figures.

1st Embodiment

Figure 1B:
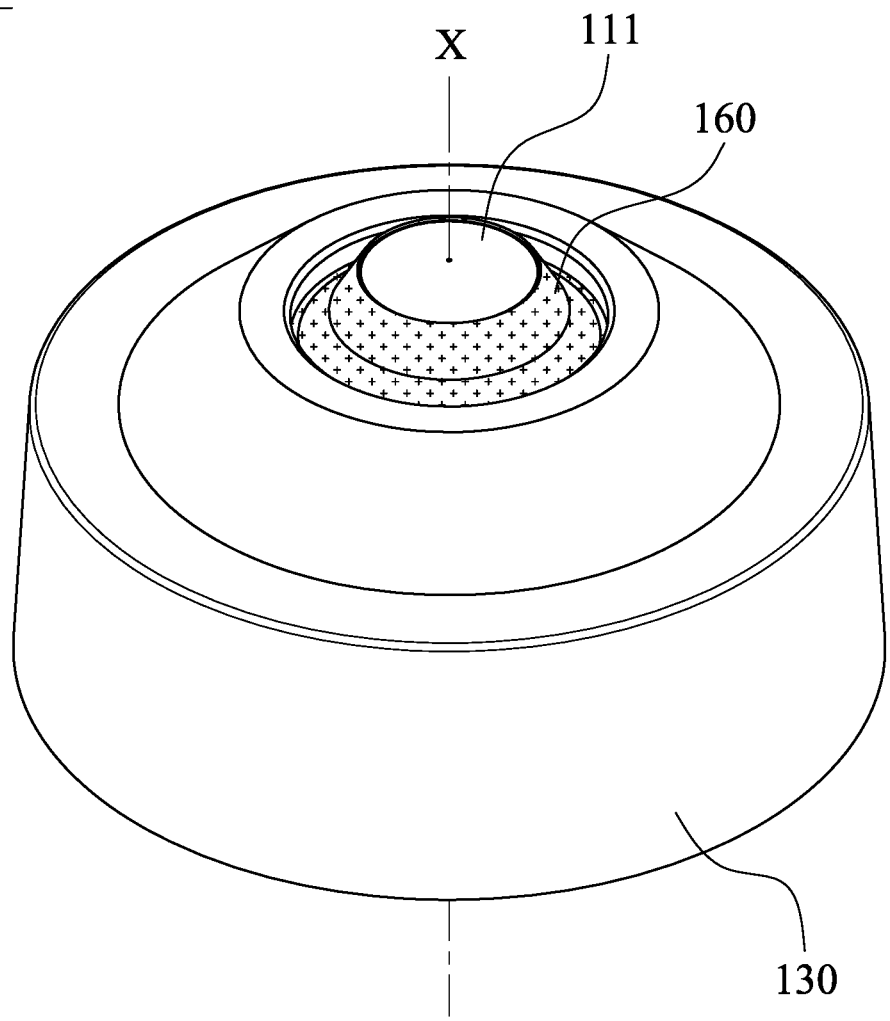
FIG. 1B is a three-dimensional view of an imaging lens assembly according to the 1st embodiment in FIG. 1A.
Figure 1C:
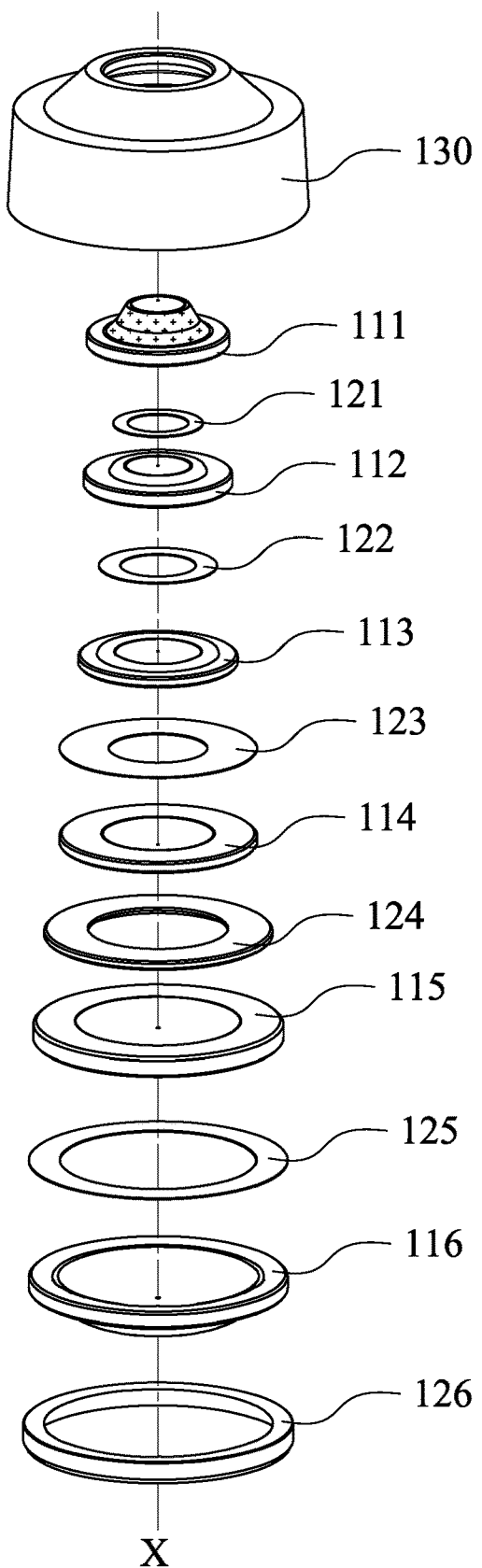
FIG. 1C is an exploded view of the imaging lens assembly according to the 1st embodiment in FIG. 1B.

FIG. 1A is a schematic view of a camera module 10 according to the 1st embodiment of the present disclosure. FIG. 1B is a three-dimensional view of an imaging lens assembly 110 according to the 1st embodiment in FIG. 1A. FIG. 1C is an exploded view of the imaging lens assembly 110 according to the 1st embodiment in FIG. 1B. In FIGS.

1A to 1C, the camera module 10 includes the imaging lens assembly 110, a carrier element 130, a filter element 140 and an image sensor 150, wherein an optical axis X passes through the imaging lens assembly 110, and the image sensor 150 is disposed on the image side of the imaging lens assembly 110.

The imaging lens assembly 110 includes, in order from the object side to the image side, a plastic lens element 111, a spacer 121, a plastic lens element 112, a spacer 122, a plastic lens element 113, a spacer 123, a plastic lens element 114, a spacer 124, a plastic lens element 115, a spacer 125, a plastic lens element 116, and a retainer 126, wherein the plastic lens elements 111, 112, 113, 114, 115, 116, the spacers 121, 122, 123, 124, 125, and the retainer 126 are disposed in the carrier element 130. It should be noted that the number, the configuration, surface morphology and other optical features of the plastic lens elements and the other optical elements can be arranged depend on various imaging demands, but the present disclosure is not limited thereto.

Figure 1D:
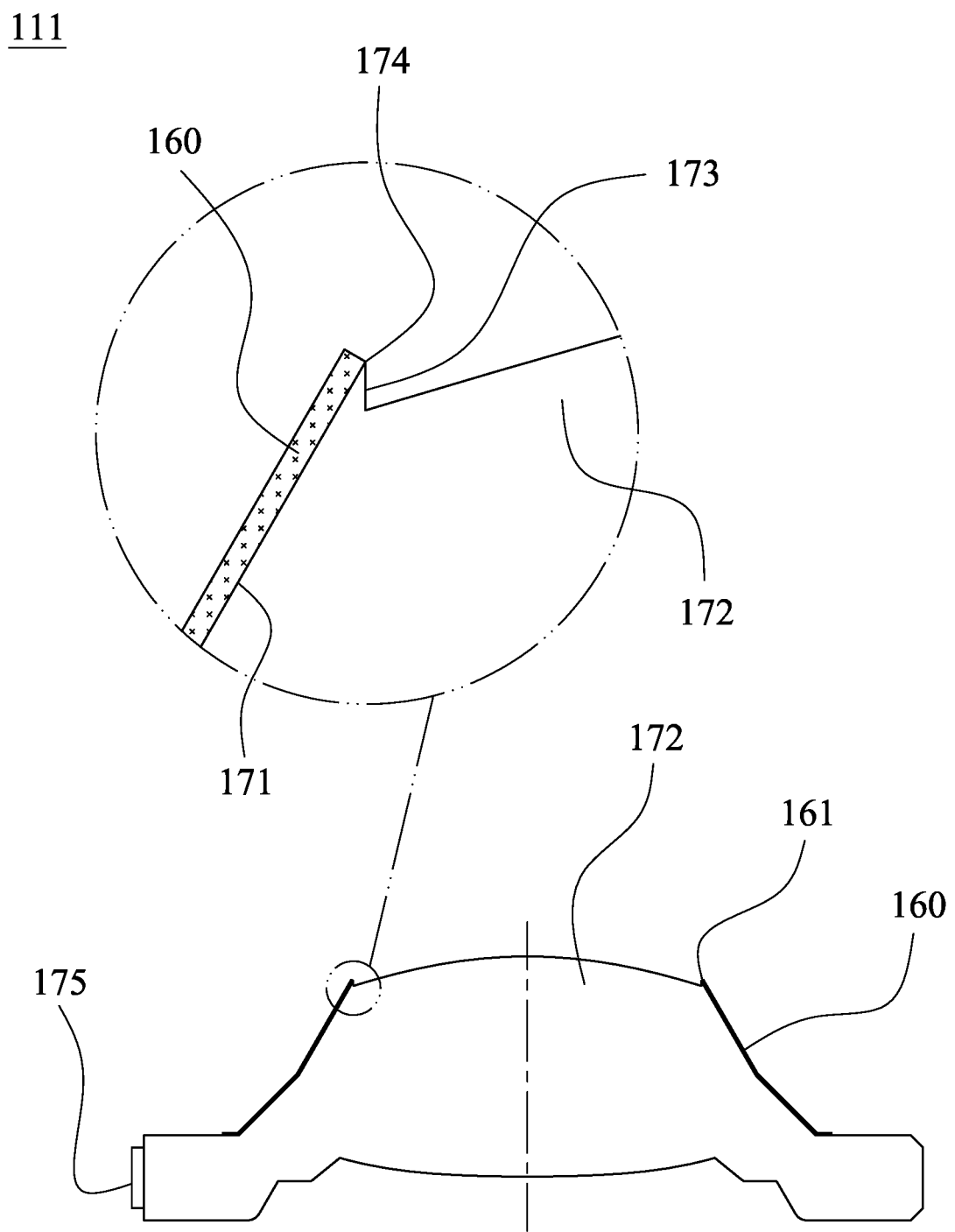
FIG. 1D is a schematic view of the plastic lens element according to the 1st embodiment in FIG. 1C.
Figure 1E:
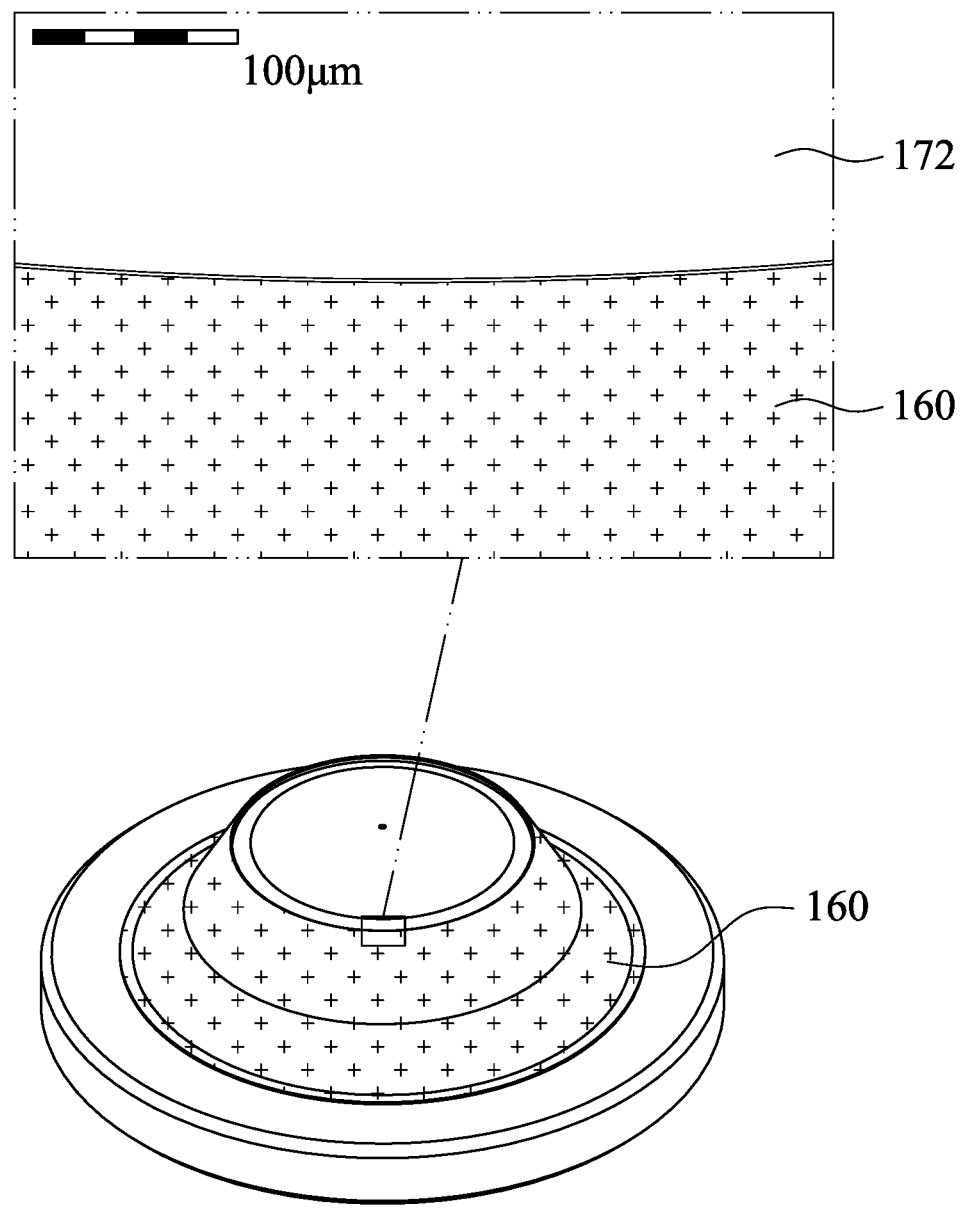
FIG. 1E is a schematic view of the light-blocking layer according to the 1st embodiment in FIG. 1D.

FIG. 1D is a schematic view of the plastic lens element 111 according to the 1st embodiment in FIG. 1C. FIG. 1E is a schematic view of the light-blocking layer 160 according to the 1st embodiment in FIG. 1D. In FIGS. 1B to 1E, a light-blocking layer 160 is disposed on a transparent surface 171 of the plastic lens element 111, and the plastic lens element 111 includes an optical effective area 172 and an injection mark 175, wherein a peripheral region 161 of the light-blocking layer 160 forms a specific shape around the optical effective area 172 so as to define an aperture region by the light-blocking layer 160, the aperture region corresponds to the optical effective area 172, and the injection mark 175 is disposed on the peripheral portion (its reference numeral is omitted) of the plastic lens element 111. It should be noted that, in order to clearly show the position and coverage of the light-blocking layer 160, the thickness of the light-blocking layer 160 in FIG. 1D is not a realistic thickness.

Furthermore, the transparent surface 171 includes an annular marked structure 173, wherein the annular marked structure 173 has an angle end 174, and the angle end 174 surrounds the optical effective area 172. The plastic lens element 111 includes an aspheric surface, and the aspheric surface corresponds to the optical effective area 172. In detail, the annular marked structure 173 can surround the optical effective area 172 integrally, and the annular marked structure 173 can be an alignment mark and a boundary during coating the light-blocking layer 160, and also can be a benchmark for inspecting the optical effective area offset or an alignment mark for assembling, but it is not limited thereto. Therefore, overall optical quality of the imaging lens assembly can be improved.

Figure 1F:
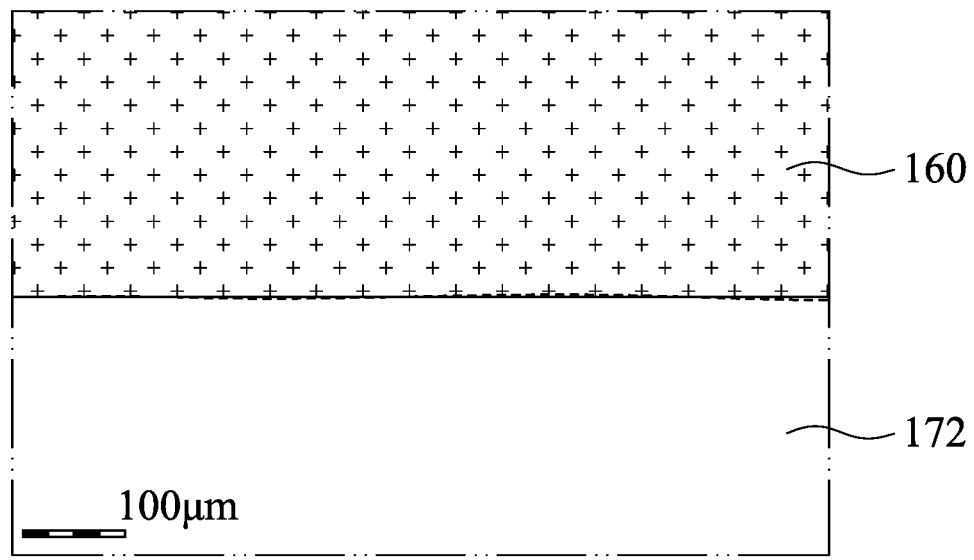
FIG. 1F is a schematic view of the light-blocking layer according to the 1st embodiment in FIG. 1E.
Figure 1G:
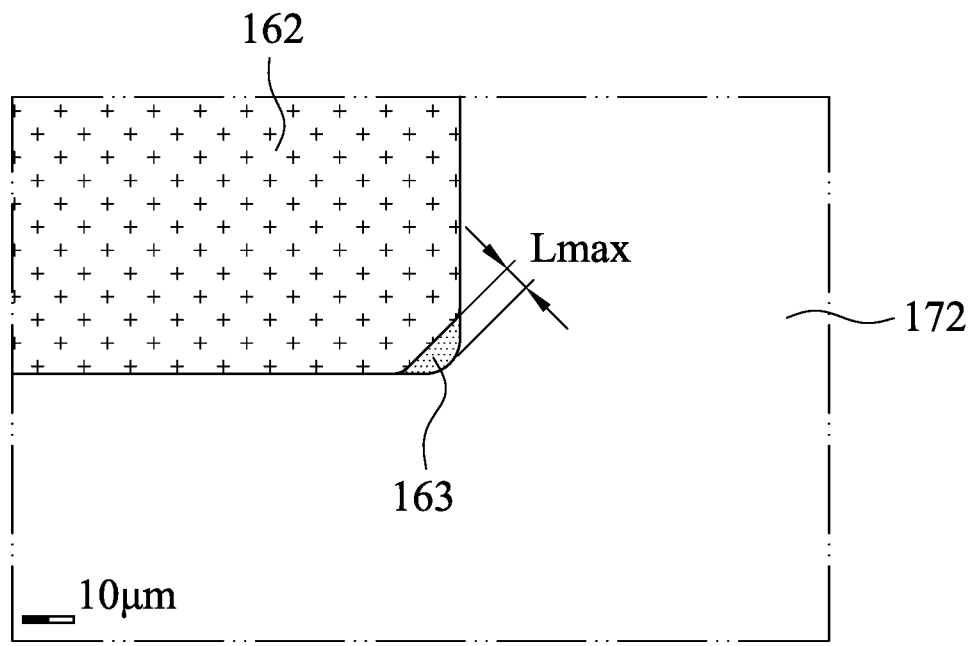
FIG. 1G is a schematic view of the compensation portion of the light-blocking layer according to the 1st embodiment in FIG. 1E.
Figure 1H:
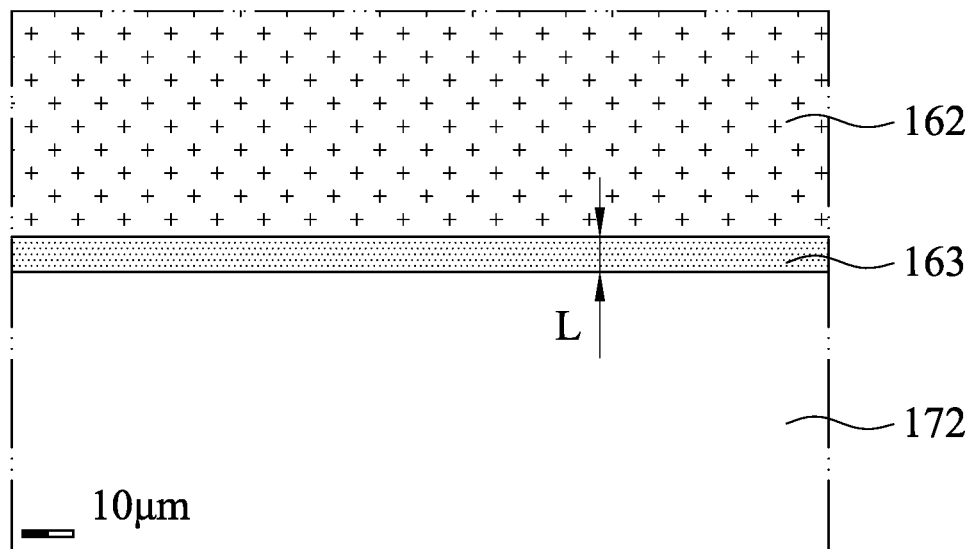
FIG. 1H is another schematic view of the compensation portion of the light-blocking layer according to the 1st embodiment in FIG. 1E.

FIG. 1F is a schematic view of the light-blocking layer 160 according to the 1st embodiment in FIG. 1E. FIG. 1G and FIG. 1H are schematic views of the compensation portion 163 of the light-blocking layer 160 according to the 1st embodiment in FIG. 1E, respectively. In FIGS. 1F to 1H, the peripheral region 161 includes a main portion 162 and a compensation portion 163, wherein the main portion 162 is physically contacted with the transparent surface 171, the main portion 162 forms a specific shape, and the compensation portion 163 is disposed on an edge of the main portion 162 adjacent to the optical effective area 172.

Figure 8B:
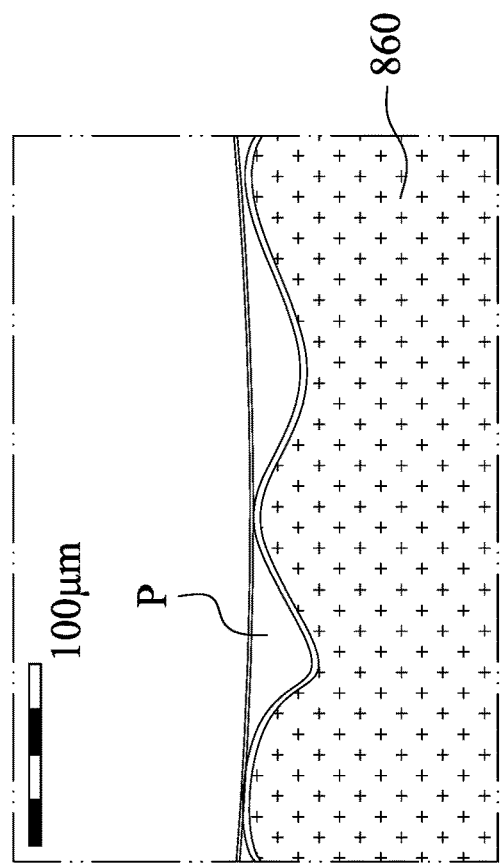
FIG. 8B is another defect schematic view of a light-blocking layer according to the prior art.
Figure 8A:
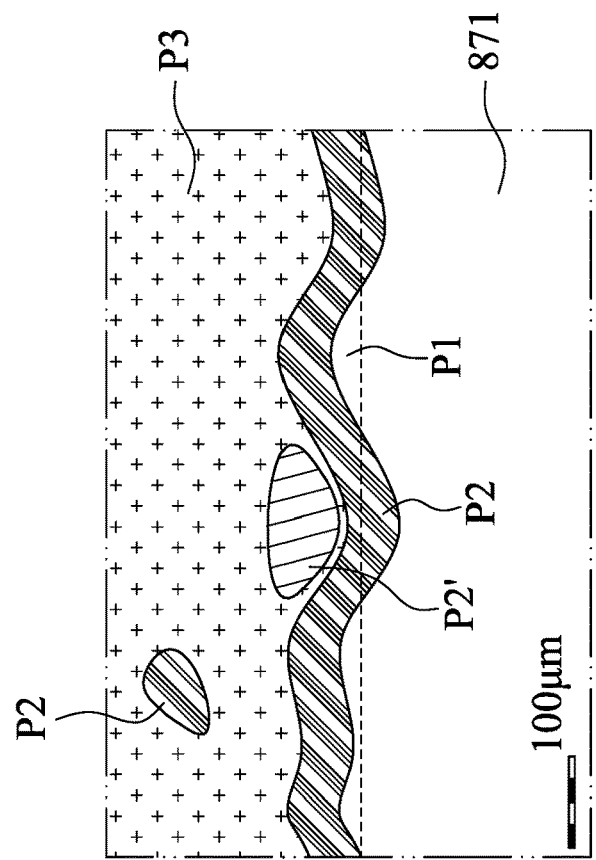
FIG. 8A is a defect schematic view of a light-blocking layer according to the prior art.
Figure 8D:
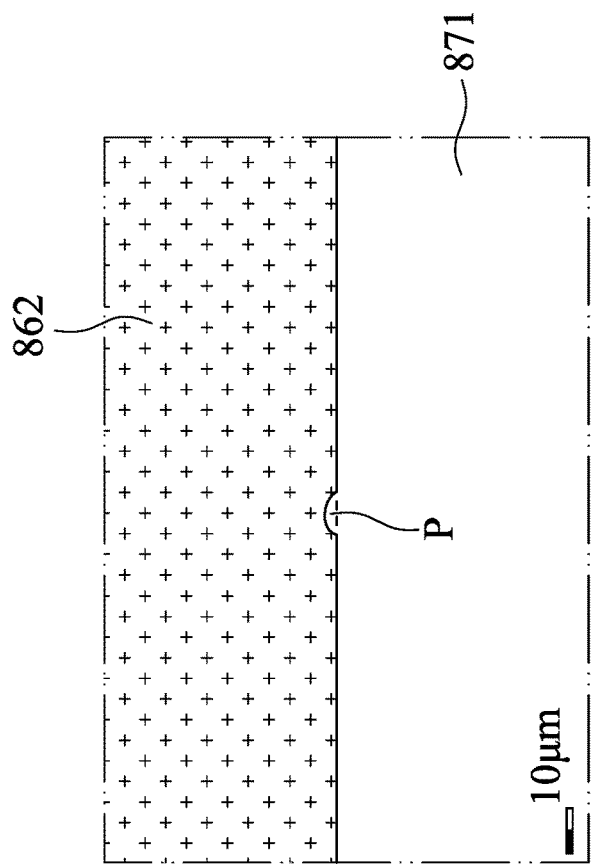
FIG. 8D is another defect schematic view of a light-blocking layer according to the prior art.
Figure 8C:
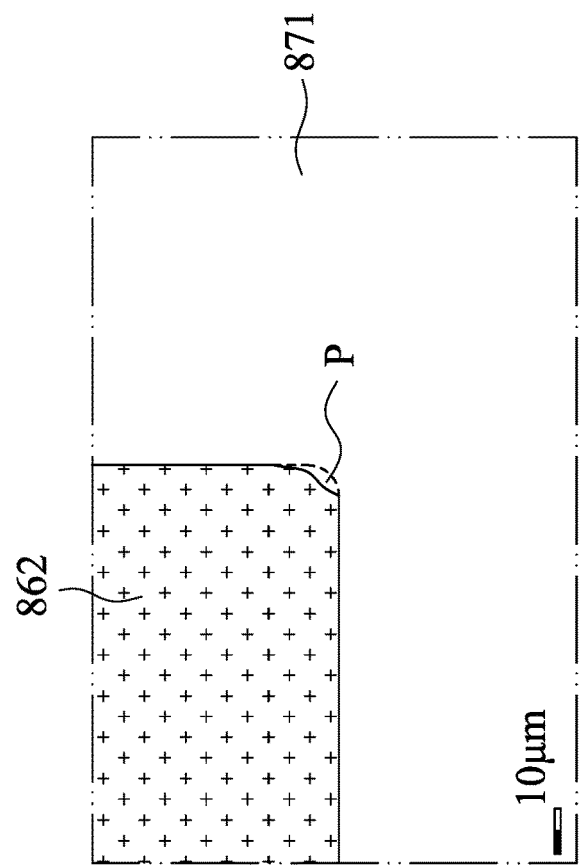
FIG. 8C is another defect schematic view of a light-blocking layer according to the prior art.

In particular, the compensation portion 163 in FIG. 1G can improve the defect P of the prior art in FIG. 8C, and the compensation portion 163 in FIG. 1H can improve the defect P of the prior art in FIG. 8D. Therefore, the compensation portion 163 has a pre-compensation function, which can eliminate the random defect that may occur in the main portion 162 and make the peripheral region 161 achieve a better roundness, so that the light-shielding function of the light-blocking layer 160 can be ensured.

When an extension distance of the compensation portion 163 is L, a maximum extension distance of the compensation portion 163 is Lmax, and an area of the compensation portion 163 is A, the Lmax/√(A) in FIG. 1G is 0.7.

Figure 1I:
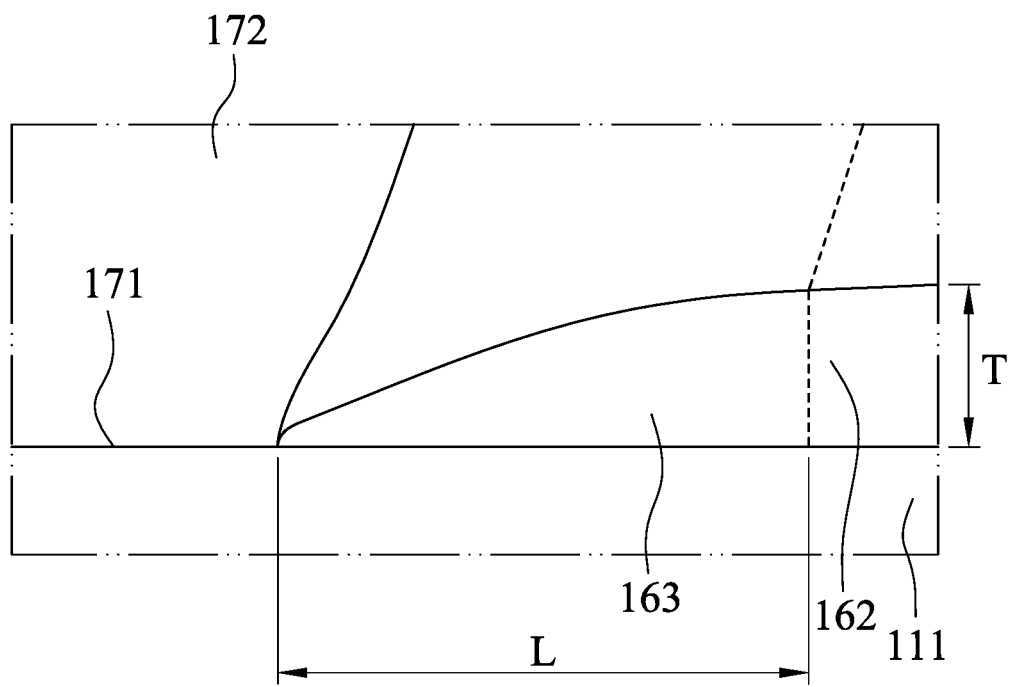
FIG. 1I is a schematic view of the parameter of the light-blocking layer of the 1st example according to the 1st embodiment in FIG. 1E.
Figure 1J:
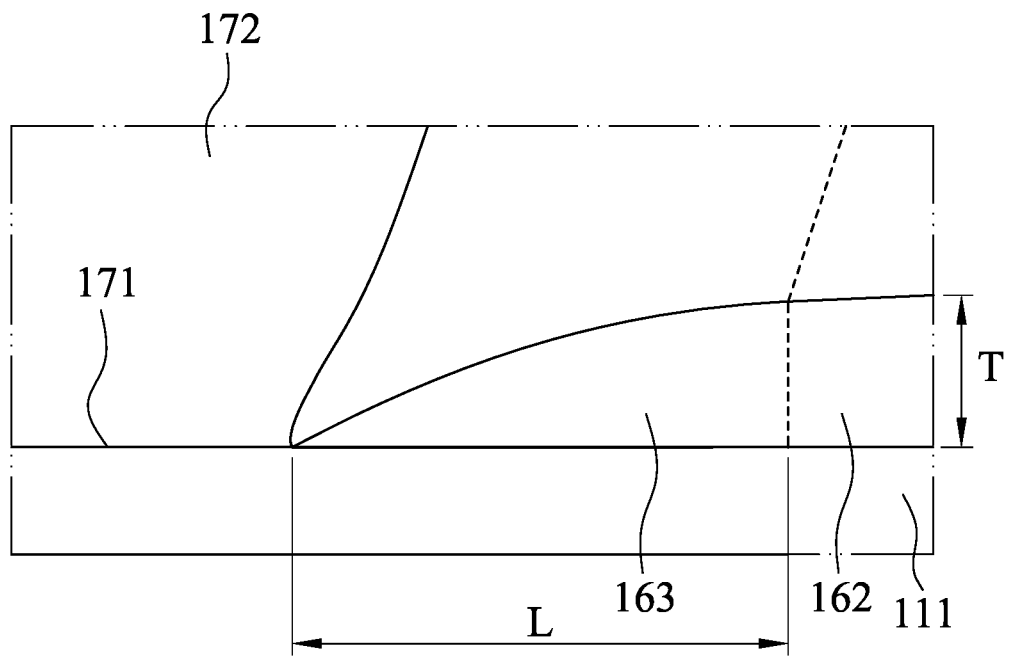
FIG. 1J is a schematic view of the parameter of the light-blocking layer of the 2nd example according to the 1st embodiment in FIG. 1E.
Figure 1K:
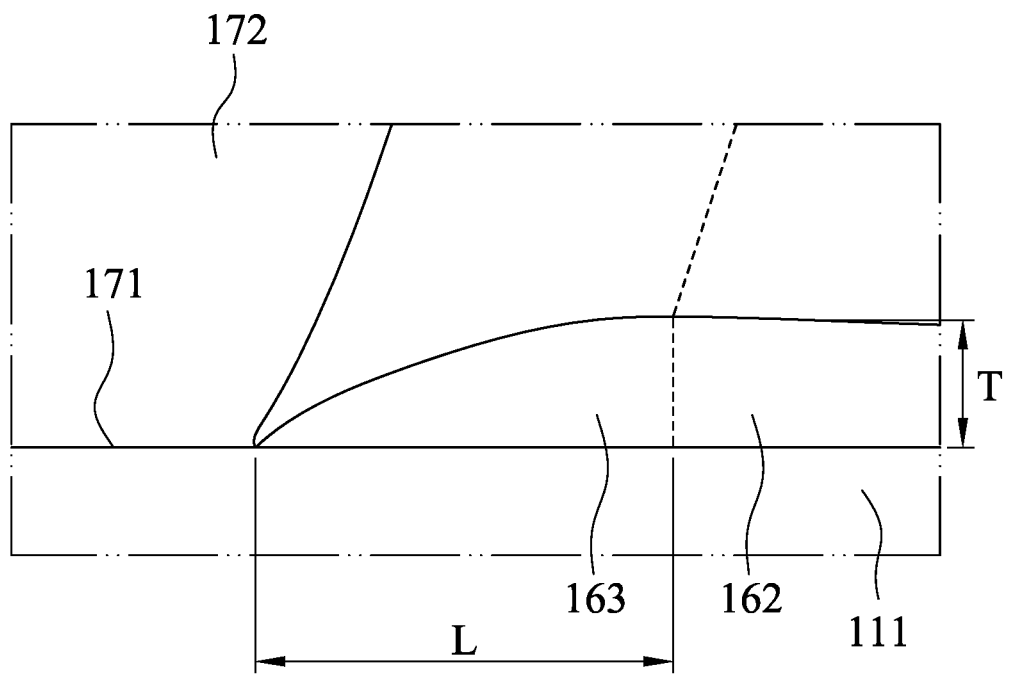
FIG. 1K is a schematic view of the parameter of the light-blocking layer of the 3rd example according to the 1st embodiment in FIG. 1E.
Figure 1L:
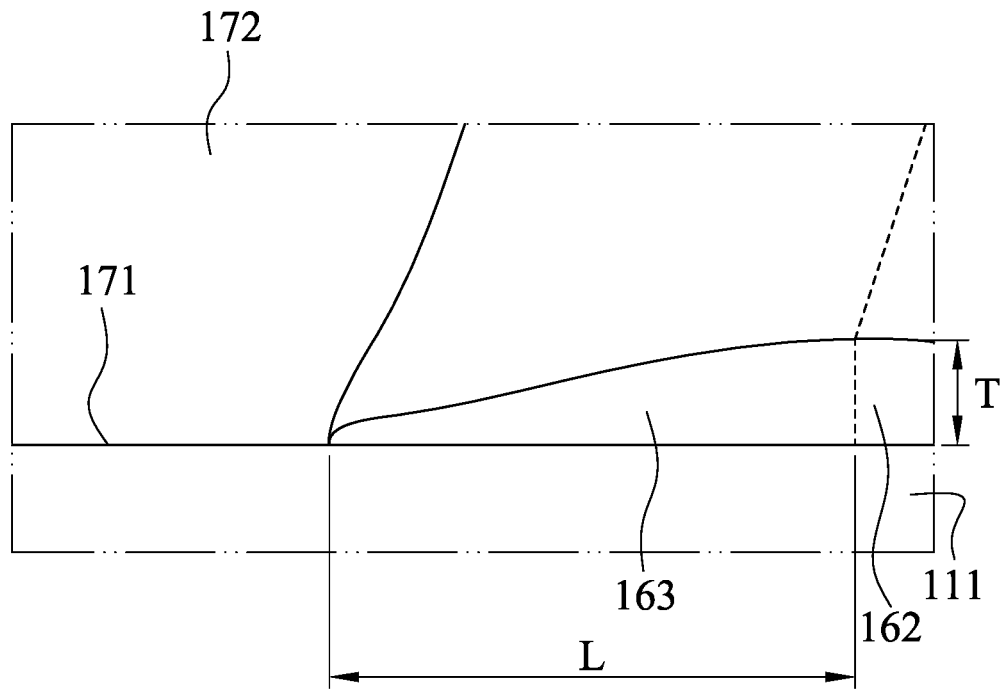
FIG. 1L is a schematic view of the parameter of the light-blocking layer of the 4th example according to the 1st embodiment in FIG. 1E.
Figure 1M:
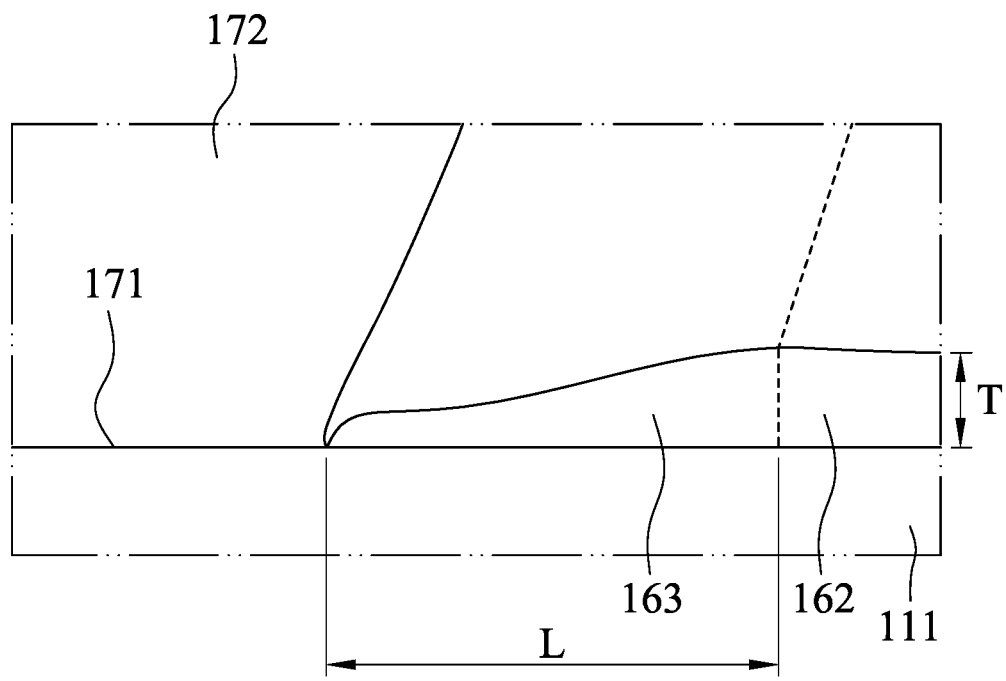
FIG. 1M is a schematic view of the parameter of the light-blocking layer of the 5th example according to the 1st embodiment in FIG. 1E.
Figure 1N:
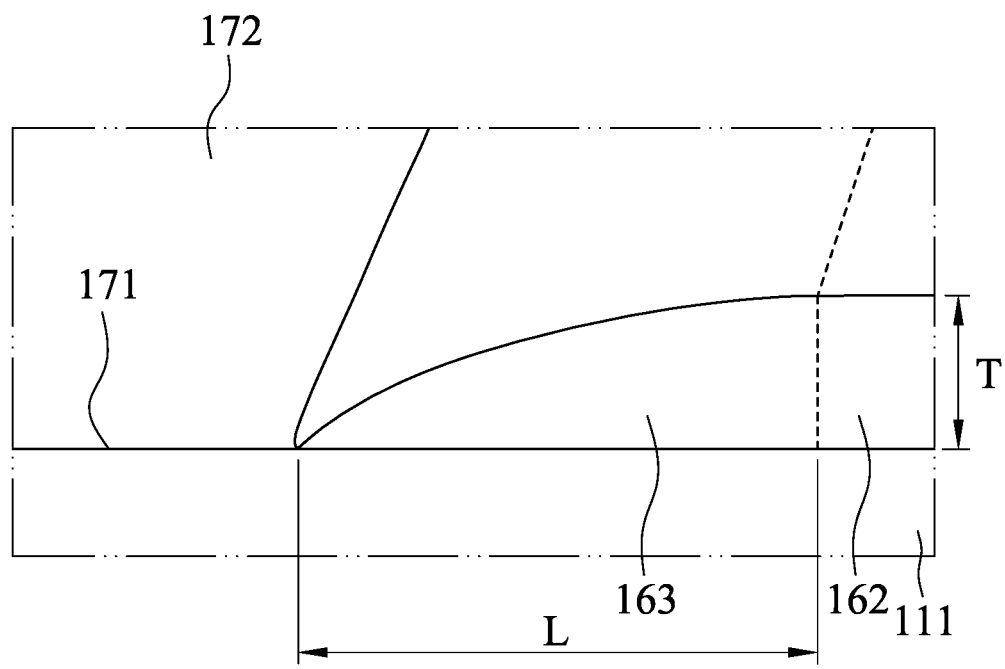
FIG. 1N is a schematic view of the parameter of the light-blocking layer of the 6th example according to the 1st embodiment in FIG. 1E.

FIG. 1I is a schematic view of the parameter of the light-blocking layer 160 of the 1st example according to the 1st embodiment in FIG. 1E. FIG. 1J is a schematic view of the parameter of the light-blocking layer 160 of the 2nd example according to the 1st embodiment in FIG. 1E. FIG. 1K is a schematic view of the parameter of the light-blocking layer 160 of the 3rd example according to the 1st embodiment in FIG. 1E. FIG. 1L is a schematic view of the parameter of the light-blocking layer 160 of the 4th example according to the 1st embodiment in FIG. 1E. FIG. 1M is a schematic view of the parameter of the light-blocking layer 160 of the 5th example according to the 1st embodiment in FIG. 1E. FIG. 1N is a schematic view of the parameter of the light-blocking layer 160 of the 6th example according to the 1st embodiment in FIG. 1E. In FIGS. 1I to 1N, the compensation portion 163 is closer to the optical effective area 172 than the main portion 162 to the optical effective area 172, the compensation portion 163 extends toward a direction close to the optical effective area 172, and the optical density of the compensation portion 163 is lower than the optical density of the main portion 162.

Figure 1O:
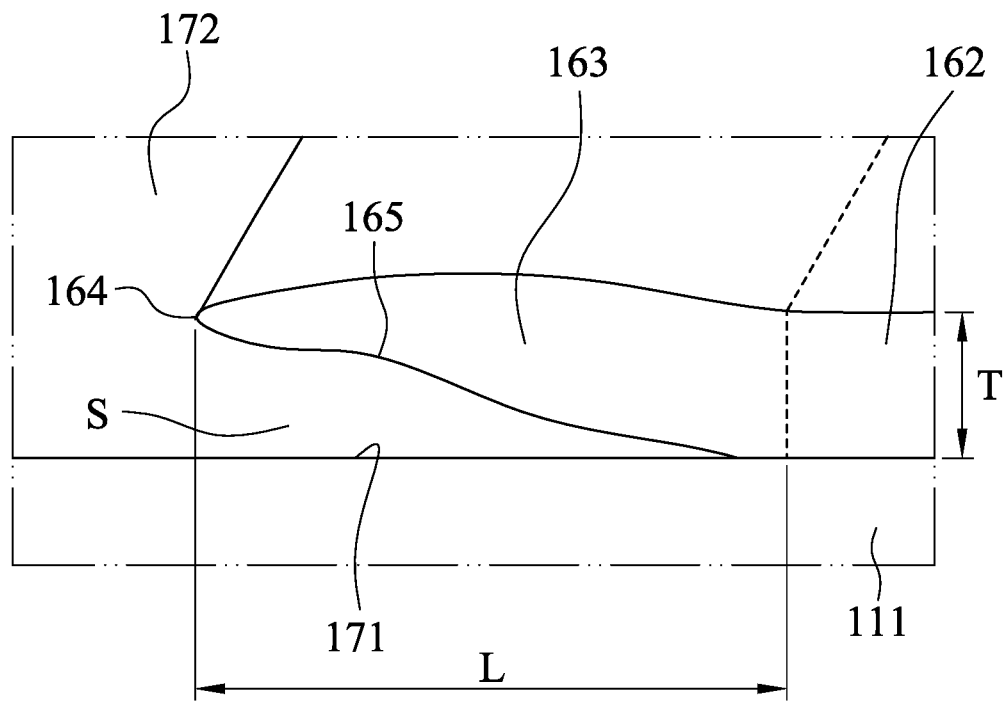
FIG. 1O is a schematic view of the parameter of the light-blocking layer of the 7th example according to the 1st embodiment in FIG. 1E.
Figure 1P:
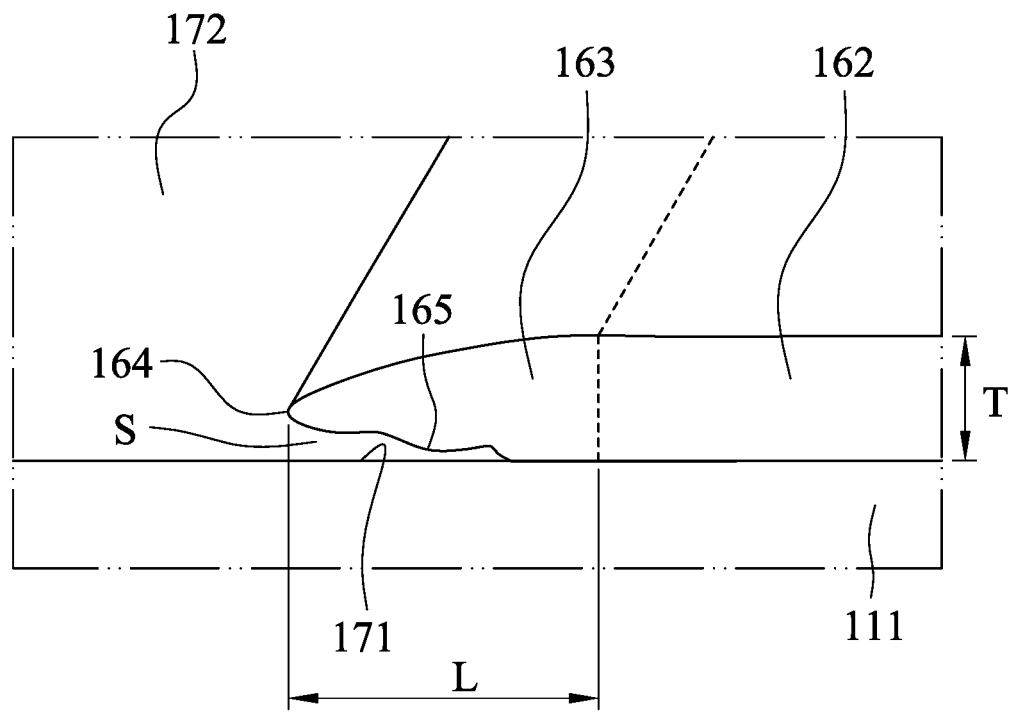
FIG. 1P is a schematic view of the parameter of the light-blocking layer of the 8th example according to the 1st embodiment in FIG. 1E.
Figure 1Q:
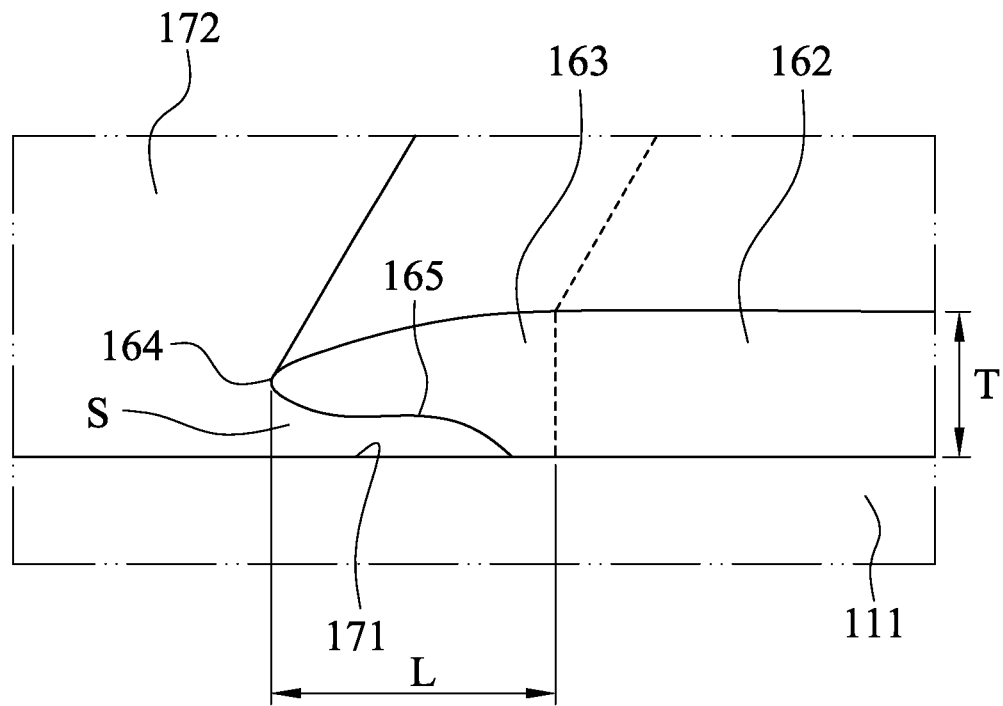
FIG. 1Q is a schematic view of the parameter of the light-blocking layer of the 9th example according to the 1st embodiment in FIG. 1E.
Figure 1R:
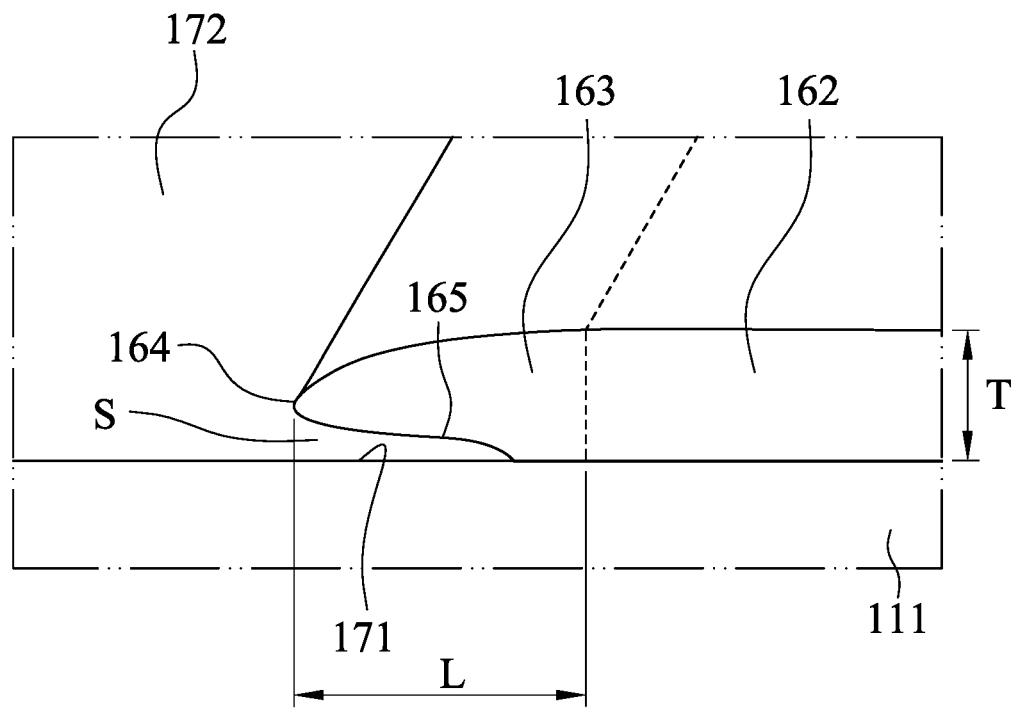
FIG. 1R is a schematic view of the parameter of the light-blocking layer of the 10th example according to the 1st embodiment in FIG. 1E.
Figure 1S:
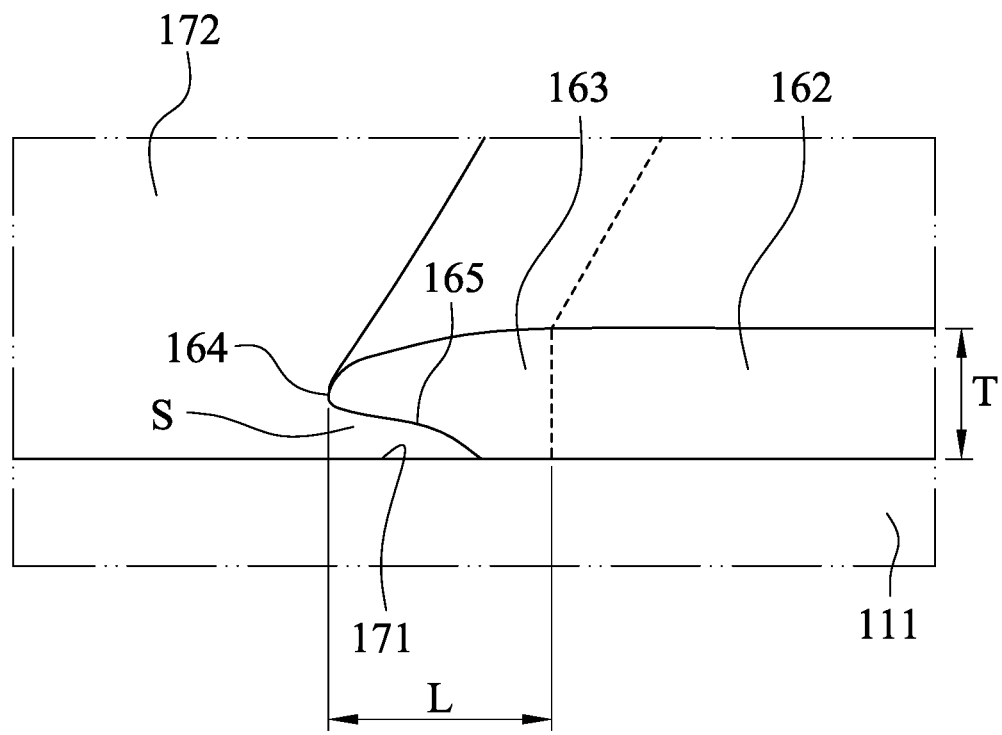
FIG. 1S is a schematic view of the parameter of the light-blocking layer of the 11th example according to the 1st embodiment in FIG. 1E.
Figure 1T:
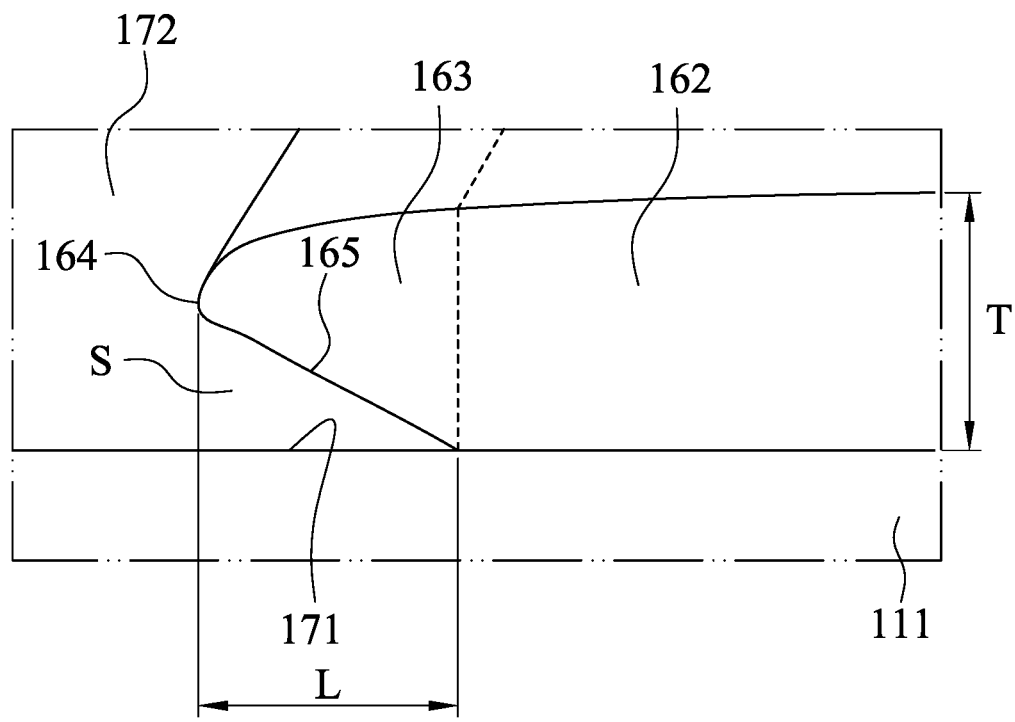
FIG. 1T is a schematic view of the parameter of the light-blocking layer of the 12th example according to the 1st embodiment in FIG. 1E.
Figure 1U:
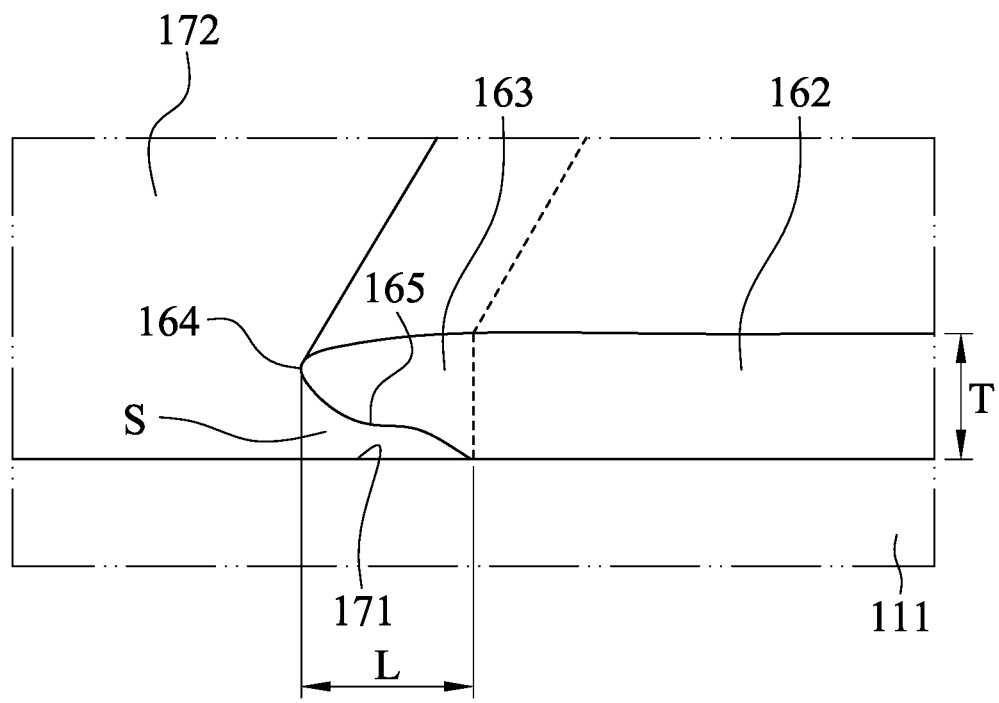
FIG. 1U is a schematic view of the parameter of the light-blocking layer of the 13th example according to the 1st embodiment in FIG. 1E.
Figure 1V:
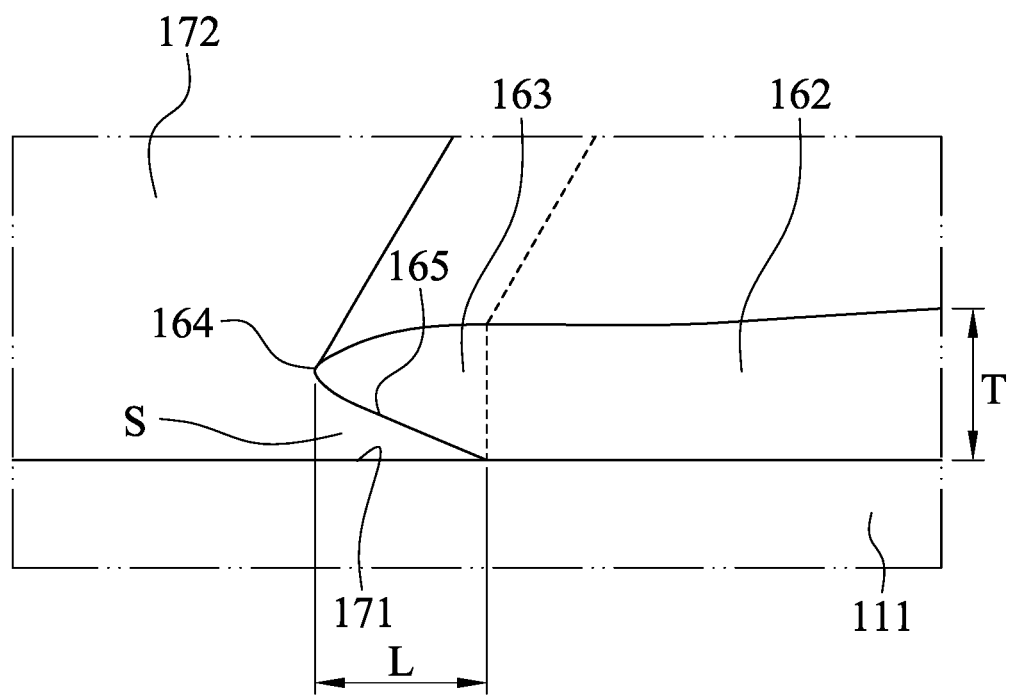
FIG. 1V is a schematic view of the parameter of the light-blocking layer of the 14th example according to the 1st embodiment in FIG. 1E.

FIG. 1O is a schematic view of the parameter of the light-blocking layer 160 of the 7th example according to the 1st embodiment in FIG. 1E. FIG. 1P is a schematic view of the parameter of the light-blocking layer 160 of the 8th example according to the 1st embodiment in FIG. 1E. FIG. 1Q is a schematic view of the parameter of the light-blocking layer 160 of the 9th example according to the 1st embodiment in FIG. 1E. FIG. 1R is a schematic view of the parameter of the light-blocking layer 160 of the 10th example according to the 1st embodiment in FIG. 1E. FIG. 1S is a schematic view of the parameter of the light-blocking layer 160 of the 11th example according to the 1st embodiment in FIG. 1E. FIG. 1T is a schematic view of the parameter of the light-blocking layer 160 of the 12th example according to the 1st embodiment in FIG. 1E. FIG. 1U is a schematic view of the parameter of the light-blocking layer 160 of the 13th example according to the 1st embodiment in FIG. 1E. FIG. 1V is a schematic view of the parameter of the light-blocking layer 160 of the 14th example according to the 1st embodiment in FIG. 1E. In FIGS. 1O to 1V, the compensation portion 163 extends toward a direction close to the optical effective area 172 and includes a projecting end 164 and a reverse tilting surface 165. The projecting end 164 is disposed on an end away from the main portion 162, and the reverse tilting surface 165 is toward the transparent surface 171. The reverse tilting surface 165 approaches the transparent surface 171 along a direction from the projecting end 164 close to the main portion 162, and an air space S is formed between the reverse tilting surface 165 and the transparent surface 171. Therefore, an optical trap structure between the compensation portion 163 and the plastic lens element 111 is formed so as to reduce the generation of the stray light.

When a thickness of the main portion 162 is T, and an extension distance of the compensation portion 163 is L, the data of the examples in FIGS. 1I to 1V satisfied the following conditions in Table 2.

TABLE 2

|  | T (um) | L (um) | $\tan^{-1}$(T/L) (degrees) |
|---|---|---|---|
| FIG. 1I | 3.2 | 10.6 | 16.8 |
| FIG. 1J | 3.0 | 9.9 | 16.86 |
| FIG. 1K | 2.5 | 8.3 | 16.76 |
| FIG. 1L | 2.1 | 10.5 | 11.31 |
| FIG. 1M | 1.9 | 9.0 | 11.92 |
| FIG. 1N | 6.2 | 20.8 | 16.6 |
| FIG. 1O | 2.9 | 11.8 | 13.81 |
| FIG. 1P | 2.5 | 6.2 | 21.96 |
| FIG. 1Q | 2.9 | 5.7 | 26.97 |
| FIG. 1R | 2.6 | 5.8 | 24.15 |
| FIG. 1S | 2.6 | 4.5 | 30.02 |
| FIG. 1T | 5.2 | 5.2 | 45 |
| FIG. 1U | 2.5 | 3.4 | 36.33 |
| FIG. 1V | 3.0 | 3.4 | 41.42 |

In the 1st embodiment of the present disclosure, the image sensor 150 is for defining a maximum image height, the imaging lens assembly 110 corresponds to the maximum image height for defining a relative illumination and a half field of view. When the maximum image height of the camera module 10 is ImgH, the relative illumination of imaging lens assembly 110 is RI, the half field of view is HFOV, the optical density of main portion 162 is DM, the thickness of main portion 162 is T, the roughness of main portion 162 is RM, and the roughness of transparent surface 171 is RO, the aforementioned parameters satisfy the following conditions in Table 3.

TABLE 3

| 1st embodiment | | | |
|---|---|---|---|
| ImgH (mm) | 3.28 | DM/T (um$^{-1}$) | 0.7 |
| RI (%) | 27.9 | HFOV (degrees) | 41.75 |
| DM | 5.6 | RI × sin(HFOV) | 0.19 |
| T (um) | 8 | RM (um) | 0.054 |
| RO (um) | 0.061 | \|1 − RO/RM\| | 0.13 |

2nd Embodiment

Figure 2A:
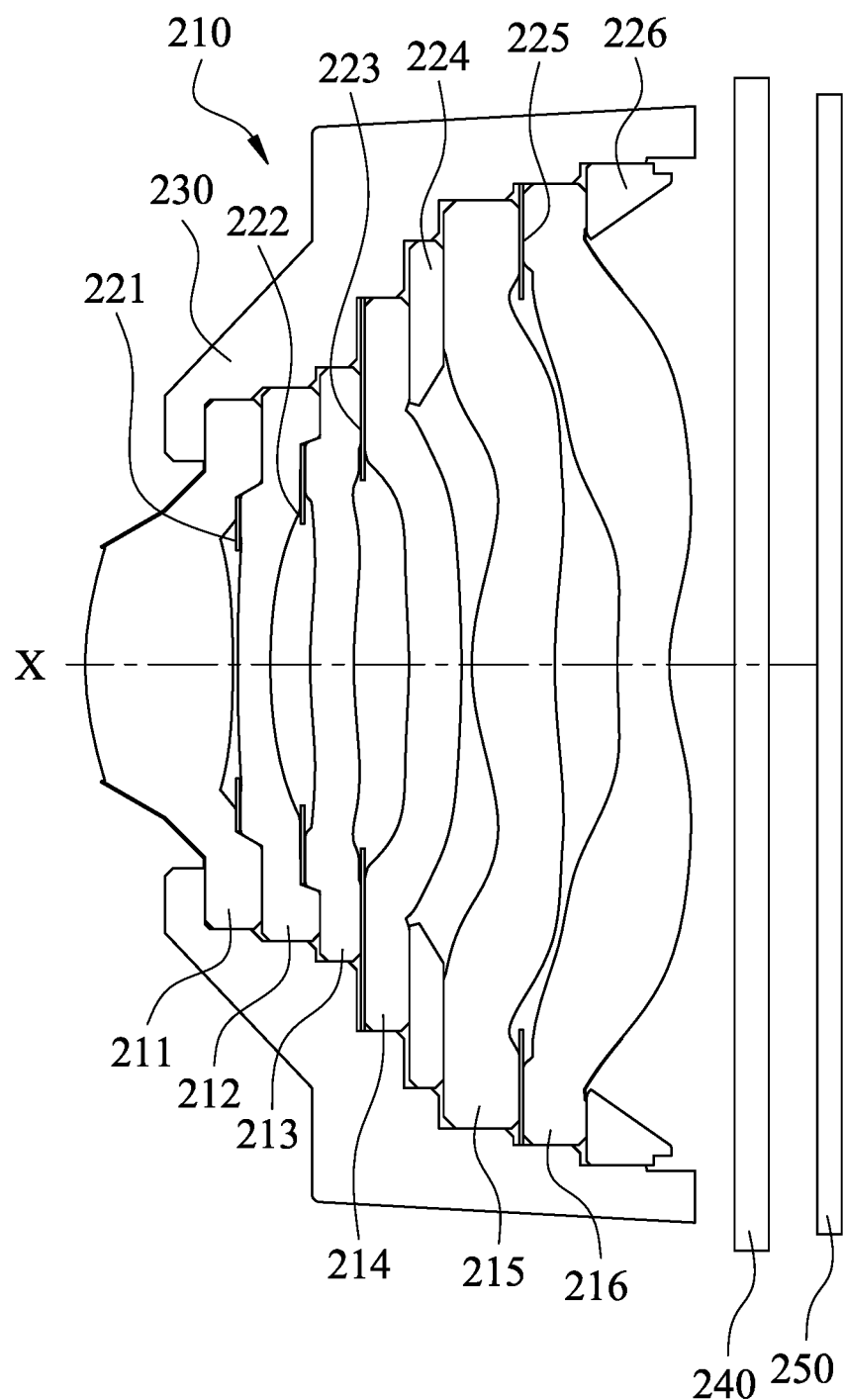
FIG. 2A is a schematic view of a camera module according to the 2nd embodiment of the present disclosure.
Figure 2B:
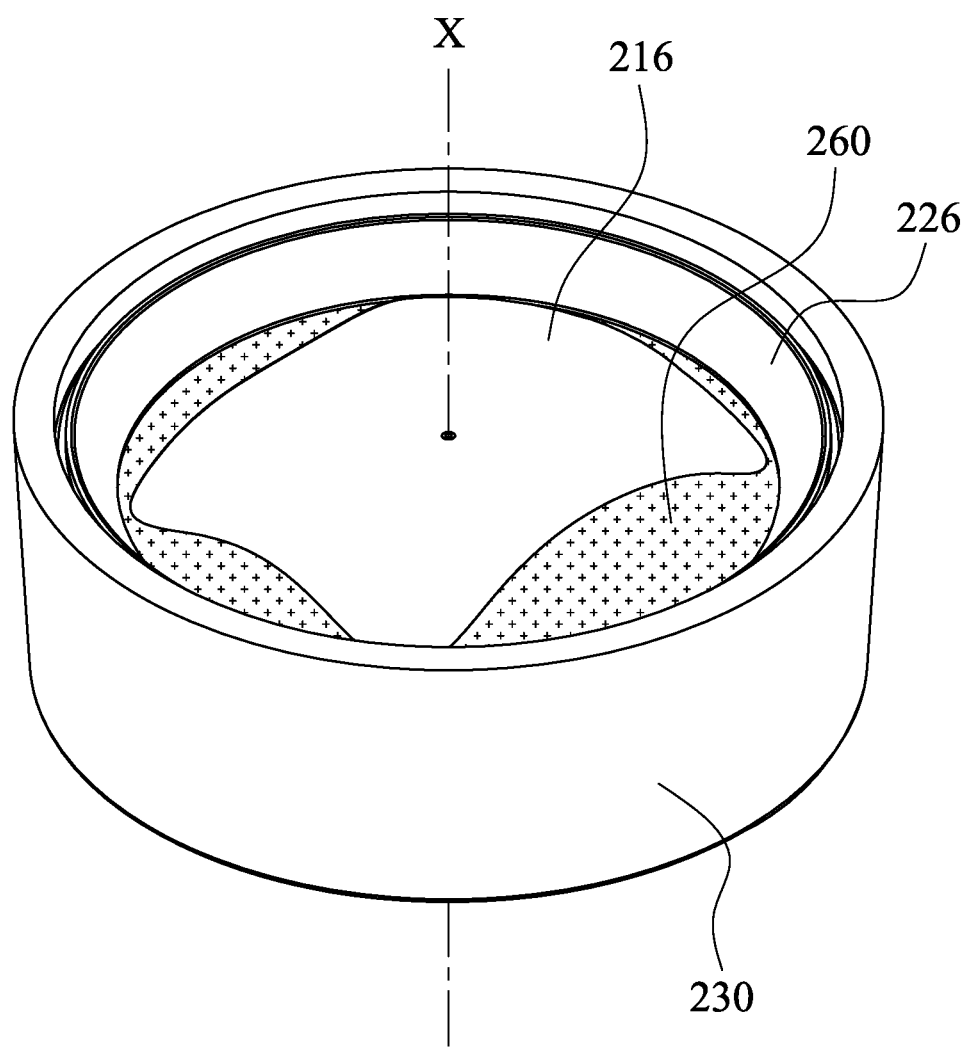
FIG. 2B is a three-dimensional view of an imaging lens assembly according to the 2nd embodiment in FIG. 2A.
Figure 2C:
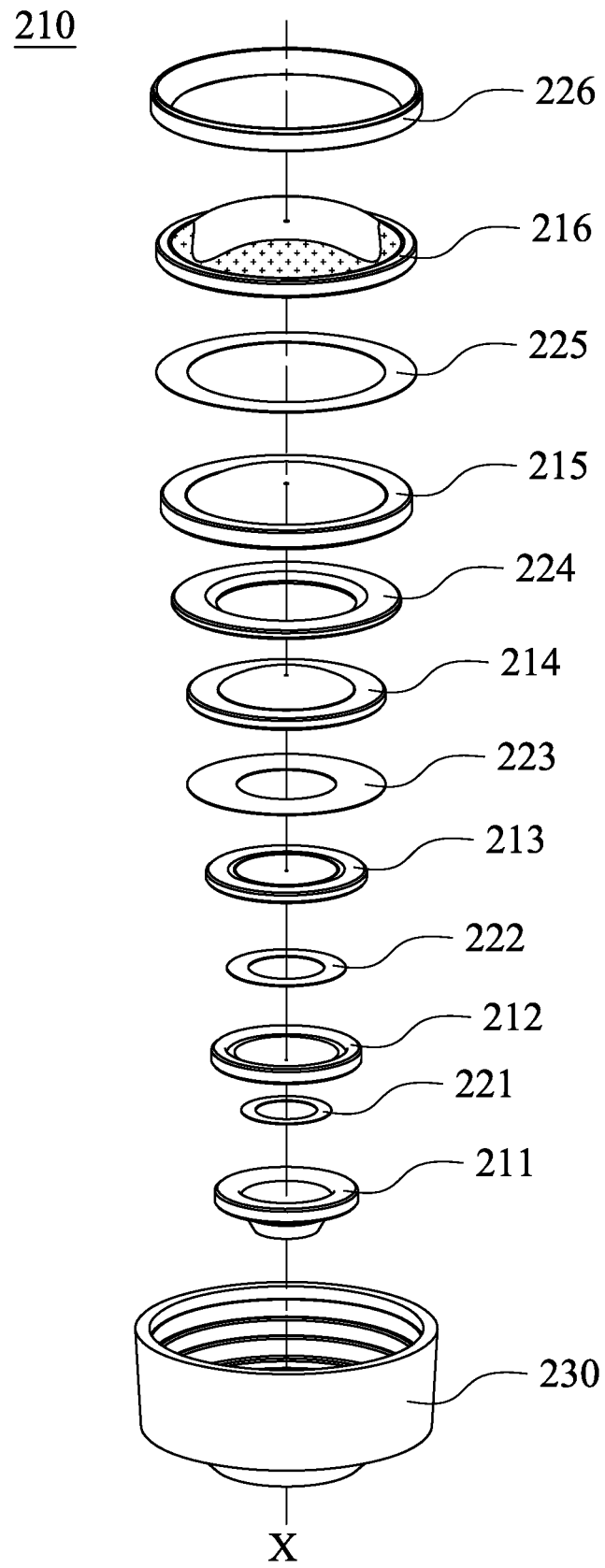
FIG. 2C is an exploded view of the imaging lens assembly according to the 2nd embodiment in FIG. 2B.

FIG. 2A is a schematic view of a camera module 20 according to the 2nd embodiment of the present disclosure. FIG. 2B is a three-dimensional view of an imaging lens assembly 210 according to the 2nd embodiment in FIG. 2A. FIG. 2C is an exploded view of the imaging lens assembly 210 according to the 2nd embodiment in FIG. 2B. In FIGS. 2A to 2C, the camera module 20 includes the imaging lens assembly 210, a carrier element 230, a filter element 240, and an image sensor 250. An optical axis X passes through the imaging lens assembly 210, and the image sensor 250 is disposed on an image side of the imaging lens assembly 210.

The imaging lens assembly 210 includes, in order from the object side to the image side, a plastic lens element 211, a spacer 221, a plastic lens element 212, a spacer 222, a plastic lens element 213, a spacer 223, a plastic lens element 214, a spacer 224, a plastic lens element 215, a spacer 225, a plastic lens element 216, a retainer 226, wherein the plastic lens elements 211, 212, 213, 214, 215, 216, the spacers 221, 222, 223, 224, 225, and the retainer 226 are disposed in the carrier element 230. It should be noted that the number, the configuration, surface morphology and other optical features of the plastic lens element and the other optical elements can be arranged depend on various imaging demands, but the present disclosure is not limited thereto.

Figure 2D:
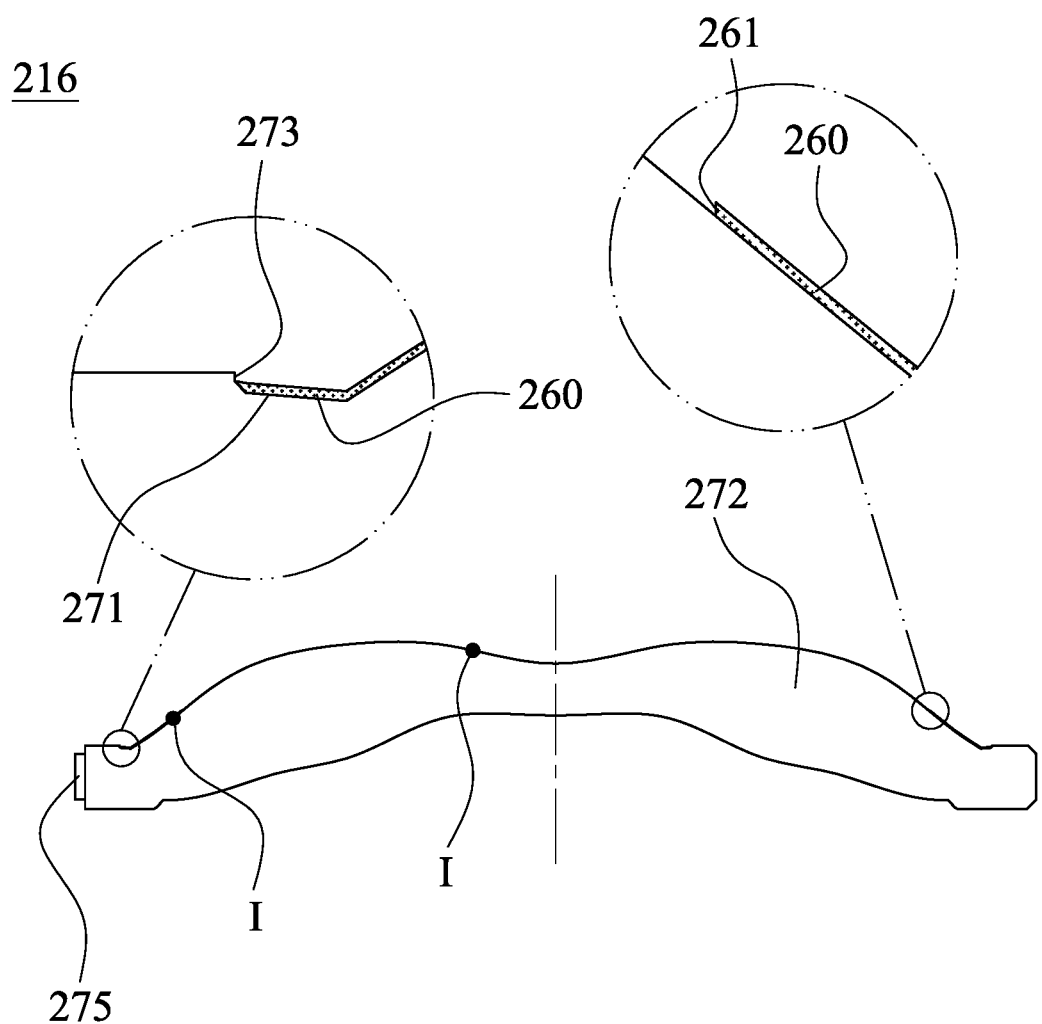
FIG. 2D is a schematic view of the plastic lens element according to the 2nd embodiment in FIG. 2C.
Figure 2E:
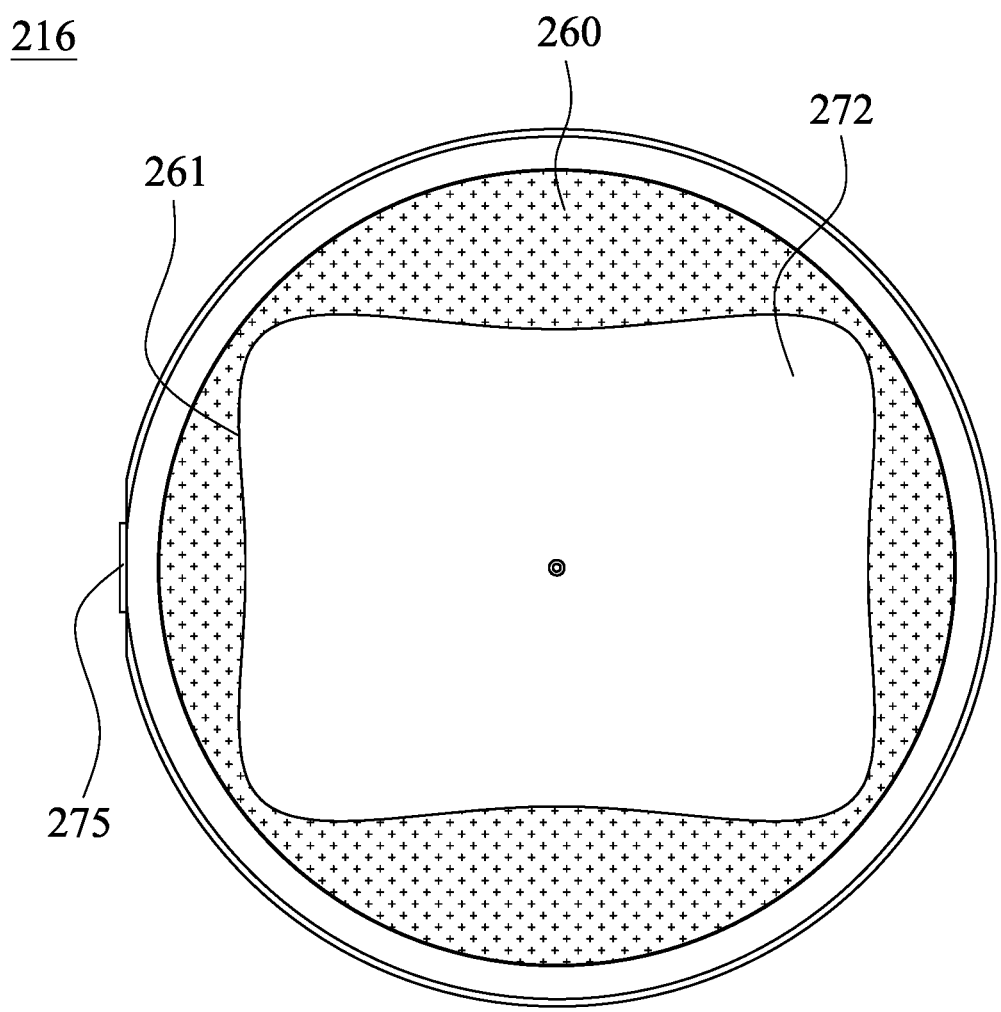
FIG. 2E is another schematic view of the plastic lens element according to the 2nd embodiment in FIG. 2C.

FIG. 2D is a schematic view of the plastic lens element 216 according to the 2nd embodiment in FIG. 2C. FIG. 2E is another schematic view of the plastic lens element 216 according to the 2nd embodiment in FIG. 2C. In FIGS. 2B to 2E, a light-blocking layer 260 is disposed on a transparent surface 271 of the plastic lens element 216, and the plastic lens element 216 includes an optical effective area 272 and an injection mark 275, wherein a peripheral region 261 of the light-blocking layer 260 forms a specific shape around the optical effective area 272 so as to define an aperture region by the light-blocking layer 260, the aperture region corresponds to the optical effective area 272, and the injection mark 275 is disposed on the peripheral portion (its reference numeral is omitted) of the plastic lens element 216. It should be noted that, in order to clearly show the position and coverage of the light-blocking layer 260, the thickness of the light-blocking layer 260 in FIG. 2D is not the realistic thickness.

Furthermore, the transparent surface 271 includes an annular marked structure 273 and two inflection points I, wherein the plastic lens element 216 includes an aspheric surface, and the aspheric surface corresponds to the optical effective area 272. In detail, the annular marked structure 273 can surround the optical effective area 272 integrally, and the annular marked structure 273 can be an alignment mark and a boundary during coating the light-blocking layer 260, and also can be a benchmark for inspecting the optical effective area offset or an alignment mark for assembling, but is not limited thereto. Therefore, overall optical quality of the imaging lens assembly can be improved.

Figure 2F:
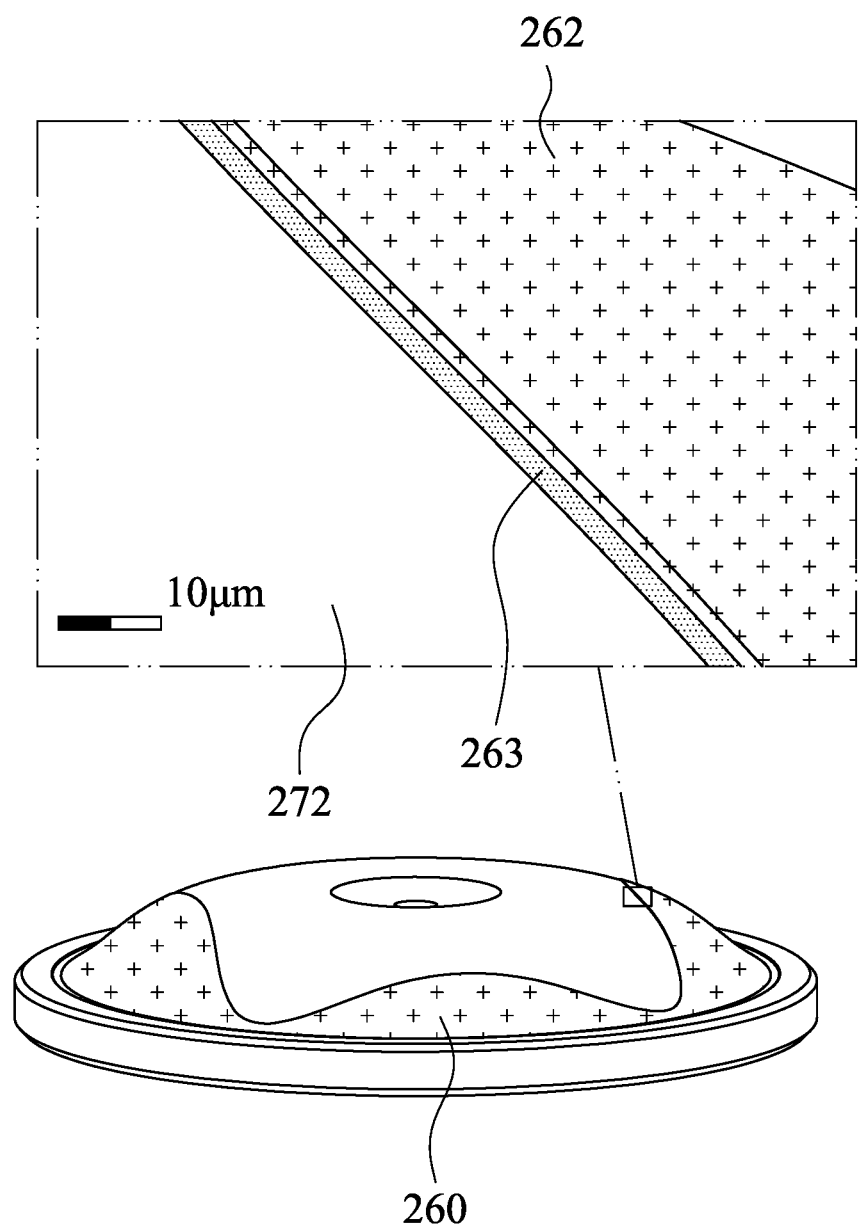
FIG. 2F is a schematic view of the compensation portion of the light-blocking layer according to the 2nd embodiment in FIG. 2E.

FIG. 2F is a schematic view of the compensation portion 263 of the light-blocking layer 260 according to the 2nd embodiment in FIG. 2E. In FIGS. 2D to 2F, the peripheral region 261 includes a main portion 262 and a compensation portion 263, wherein the main portion 262 is physically contacted with the transparent surface 271, the main portion 262 forms a specific shape, and the compensation portion 263 is disposed on an edge of the main portion 262 adjacent to the optical effective area 272.

Figure 8F:
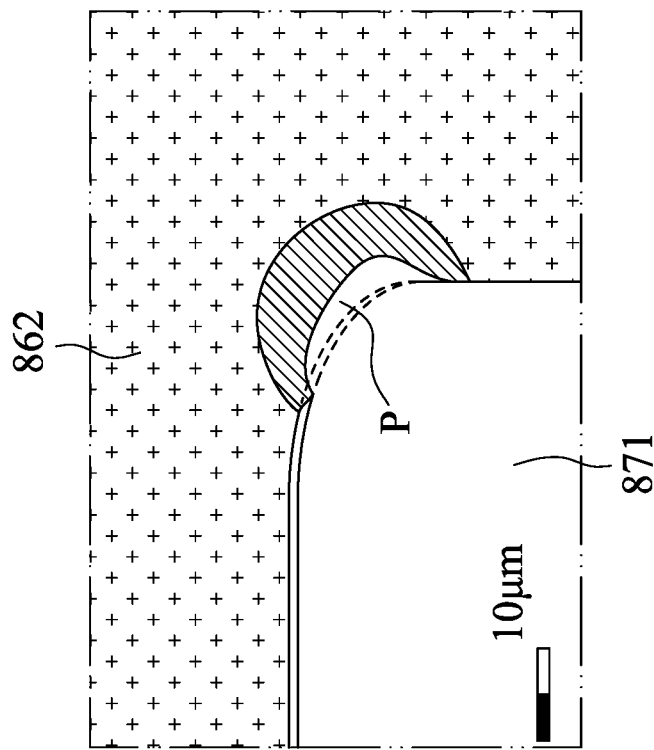
FIG. 8F is another defect schematic view of a light-blocking layer according to the prior art.
Figure 8E:
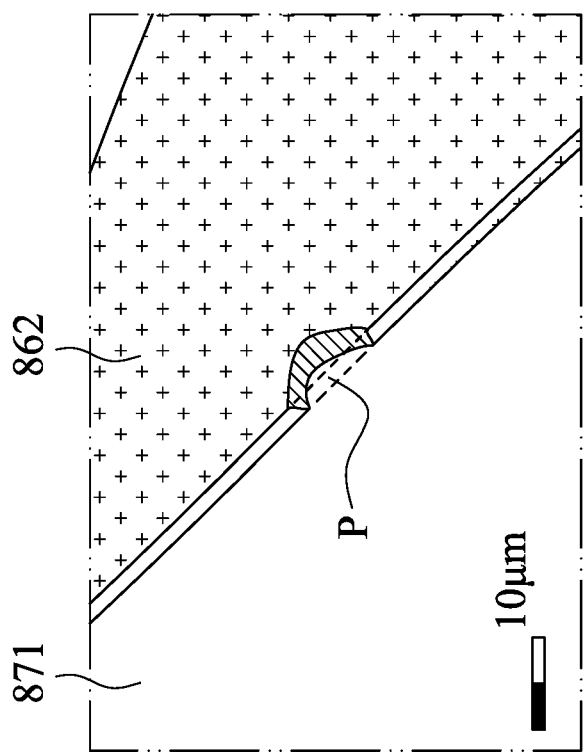
FIG. 8E is another defect schematic view of a light-blocking layer according to the prior art.

In particular, the compensation portion 263 in FIG. 2F can improve the defect P of the prior art in FIG. 8E. Therefore, the compensation portion 263 has a pre-compensation function, which can eliminate the random defect that may occur in the main portion 262, so that the light-shielding function of the light-blocking layer 260 can be ensured.

In the 2nd embodiment of the present disclosure, the image sensor 250 is for defining a maximum image height, the imaging lens assembly 210 corresponds to the maximum image height for defining a relative illumination and a half field of view. When a maximum image height of the camera module 20 is ImgH, the relative illumination of imaging lens assembly 210 is RI, a half field of view is HFOV, an optical density of main portion 262 is DM, a thickness of main portion 262 is T, a roughness of main portion 262 is RM, and a roughness of transparent surface 271 is RO, the aforementioned parameters satisfy the following conditions in Table 4.

TABLE 4

| 2nd embodiment | | | |
|---|---|---|---|
| ImgH (mm) | 3.28 | DM/T (um$^{-1}$) | 1.3 |
| RI (%) | 27.9 | HFOV (degrees) | 41.75 |
| DM | 6.11 | RI × sin(HFOV) | 0.19 |
| T (um) | 4.7 | RM (um) | 0.536 |
| RO (um) | 0.539 | \|1 − RO/RM\| | 0.006 |

It should be noted that the systems of the camera modules in the 1st embodiment and the 2nd embodiment are the same, but for elaborating the case where the light-blocking layer is disposed on different configurations of the plastic lens elements.

Also, the configuration and arrangement of the others elements in the 2nd embodiment are the same with the corresponding elements in the 1st embodiment and will not be described again herein.

3rd Embodiment

Figure 3A:
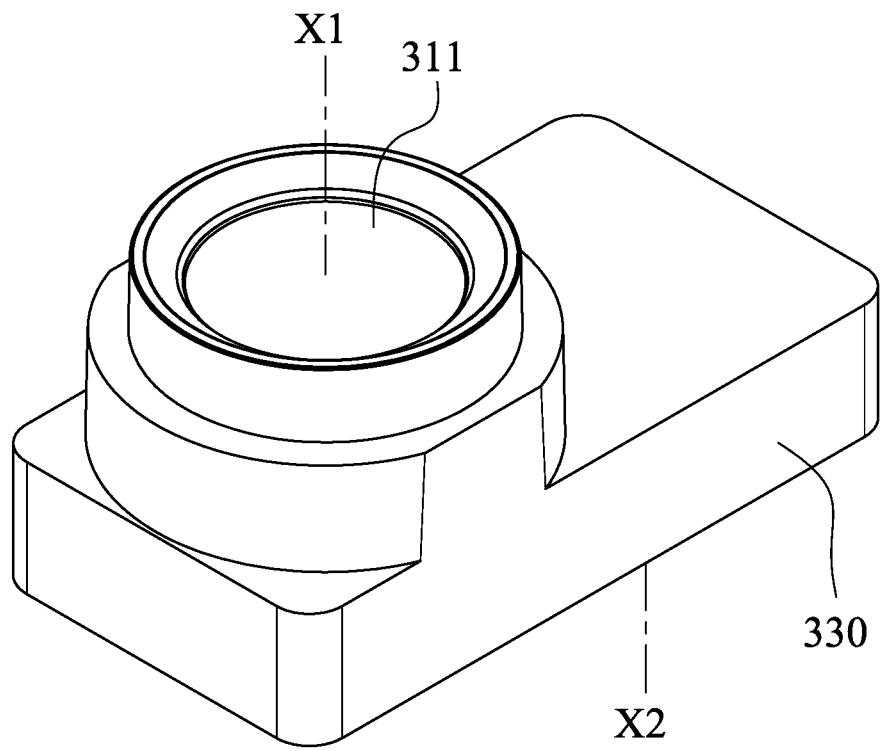
FIG. 3A is a schematic view of a camera module according to the 3rd embodiment of the present disclosure.
Figure 3B:
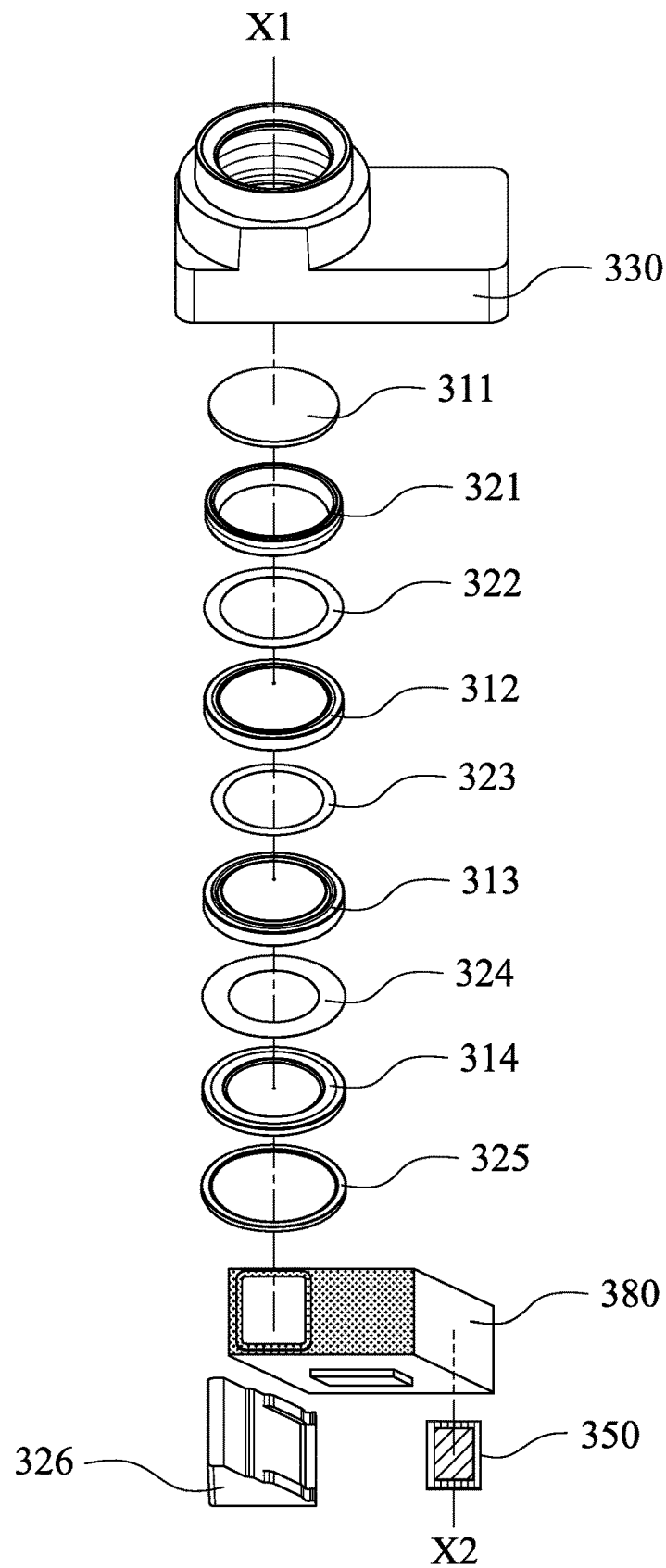
FIG. 3B is an exploded view of an imaging lens assembly according to the 3rd embodiment in FIG. 3A.

FIG. 3A is a schematic view of a camera module 30 according to the 3rd embodiment of the present disclosure. FIG. 3B is an exploded view of an imaging lens assembly according to the 3rd embodiment in FIG. 3A. In FIGS. 3A and 3B, the camera module 30 includes an imaging lens assembly (its reference numeral is omitted), a carrier element 330, and an image sensor 350, wherein the image sensor 350 is disposed on an image side of the imaging lens assembly.

The imaging lens assembly includes, in order from the object side to the image side, a plastic lens element 311, two spacers 321, 322, a plastic lens element 312, a spacer 323, a plastic lens element 313, a spacer 324, a plastic lens element 314, a retainer 325, a plastic reflective element 380, a retainer 326, wherein the plastic lens elements 311, 312, 313, 314, the spacers 321, 322, 323, 324, the retainers 325, 326, and a plastic reflective element 380 are disposed in the carrier element 330. It should be noted that the number, the configuration, surface morphology and other optical features of the plastic lens element and the other optical elements can be arranged depend on various imaging demands, but the present disclosure is not limited thereto.

In particular, light passes through the plastic lens element 311, the spacers 321, 322, the plastic lens element 312, the spacer 323, the plastic lens element 313, the spacer 324, the plastic lens element 314, the retainer 325 in sequence along a first optical axis X1, and the plastic reflective element 380 is for folding the light so that the light can enter the image sensor 350 along a second optical axis X2.

Figure 3C:
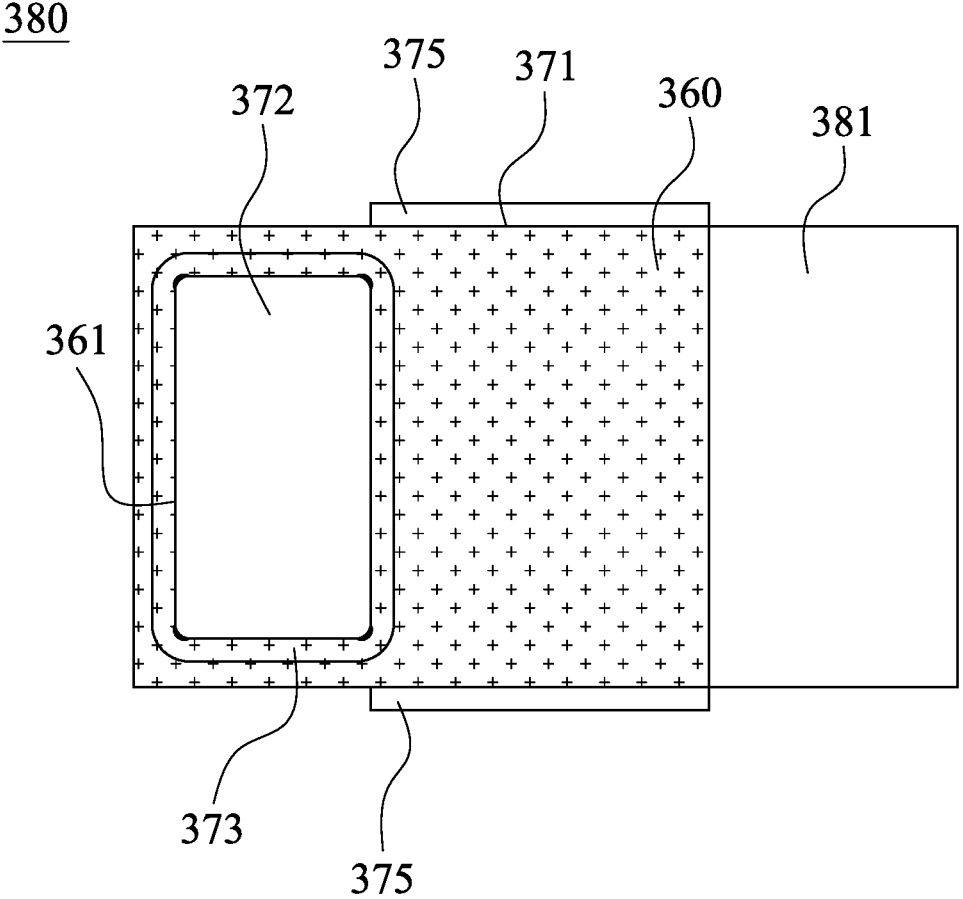
FIG. 3C is a schematic view of the plastic reflective element according to the 3rd embodiment in FIG. 3B.
Figure 3D:
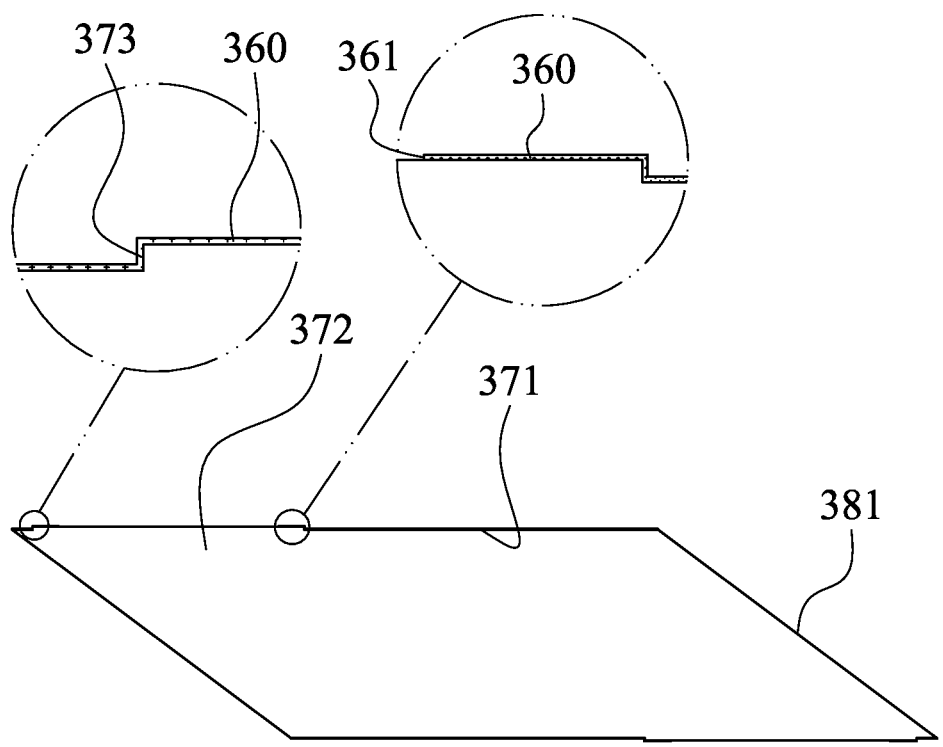
FIG. 3D is another schematic view of a reflective surface of the plastic reflective element according to the 3rd embodiment in FIG. 3B.

FIG. 3C is a schematic view of the plastic reflective element 380 according to the 3rd embodiment in FIG. 3B. FIG. 3D is another schematic view of a reflective surface 381 of the plastic reflective element 380 according to the 3rd embodiment in FIG. 3B. In FIGS. 3C and 3D, the light-blocking layer 360 is disposed on a transparent surface 371 of the plastic reflective element 380, and the plastic reflective element 380 includes an optical effective area 372, an injection mark 375, and at least one reflective surface 381, wherein a peripheral region 361 of the light-blocking layer 360 forms a specific shape around the optical effective area 372 so as to define an aperture region by the light-blocking layer 360. The aperture region corresponds to the optical effective area 372, the injection mark 375 is disposed on a peripheral portion (its reference numeral is omitted) of the plastic reflective element 380, and the reflective surface 381 and the optical effective area 372 are disposed on the same light path. It should be noted that, in order to clearly show the position and coverage of the light-blocking layer 360, the thickness of the light-blocking layer 360 in FIG. 3D is not a realistic thickness.

Figure 3E:
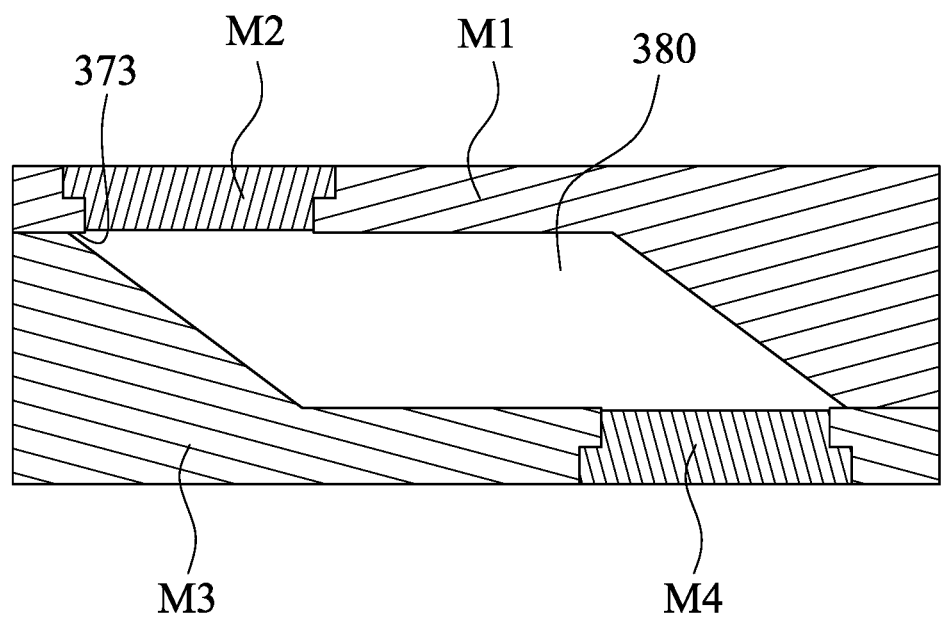
FIG. 3E is a schematic view of the plastic reflective element, a plastic injection mold, and an annular marked structure according to the 3rd embodiment in FIG. 3B.

FIG. 3E is a schematic view of the plastic reflective element 380, a plastic injection mold, and an annular marked structure 373 according to the 3rd embodiment in FIG. 3B. In FIGS. 3D and 3E, the transparent surface 371 includes the annular marked structure 373. In detail, the annular marked structure 373 can surround the optical effective area 372 integrally, and the annular marked structure 373 can be an alignment mark and a boundary during coating the light-blocking layer 360, and also can be a benchmark for inspecting the optical effective area offset or an alignment mark for assembling, but it is not limited thereto. Therefore, overall optical quality of the imaging lens assembly can be improved. Moreover, in order to form different types of surface morphology, the plastic injection mold (its reference numeral is omitted) can be combining a plurality of upper molds M1, M2 and lower molds M3, M4. The annular marked structure 373 corresponds to the removal direction of the upper molds M1, M2 and the lower molds M3, M4 so as to integrally form the annular marked structure 373 on the plastic reflective element 380. Therefore, the relative positions of the annular marked structure 373 and other elements can be ensured.

Figure 3F:
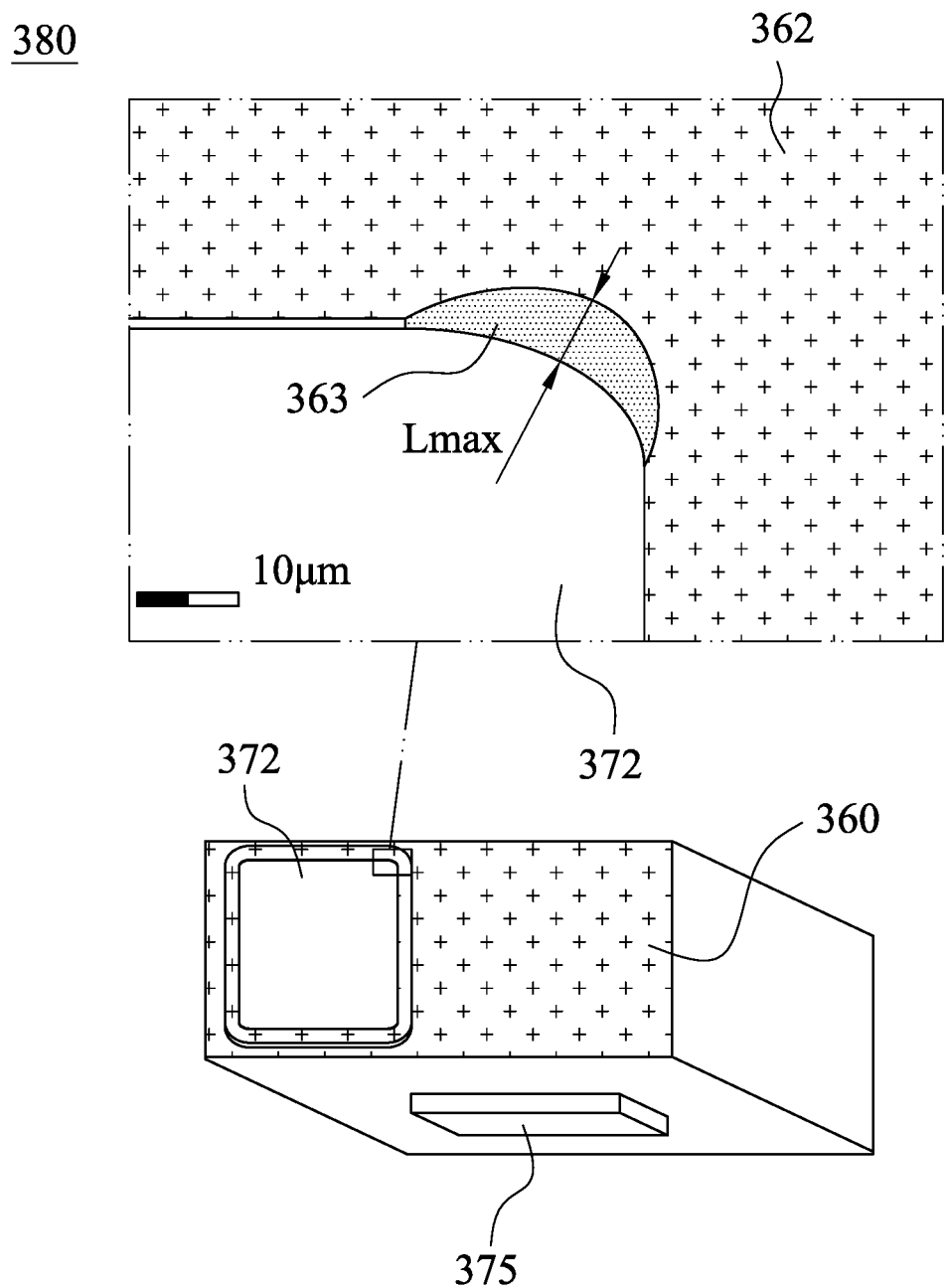
FIG. 3F is a schematic view of a compensation portion of the light-blocking layer according to the 3rd embodiment in FIG. 3D.

FIG. 3F is a schematic view of a compensation portion 363 of the light-blocking layer 360 according to the 3rd embodiment in FIG. 3D. In FIGS. 3D and 3F, the peripheral region 361 includes a main portion 362 and the compensation portion 363, wherein the main portion 362 is physically contacted with the transparent surface 371, the main portion 362 forms a specific shape, and the compensation portion 363 is disposed on an edge of the main portion 362 adjacent to the optical effective area 372.

In particular, the compensation portion 363 in FIG. 3F can improve the defect P of the prior art in FIG. 8F. Therefore, the compensation portion 363 has a pre-compensation function, which can eliminate random defect that may occur in the main portion 362, so that the light-shielding function of the light-blocking layer 360 can be ensured.

When a maximum extension distance of the compensation portion 363 is Lmax, an area of the compensation portion 363 is A, and a thickness of the main portion 362 is T, the Lmax/√(A) is 0.23 and $\tan^{-1}$(T/Lmax) is 17.6 degrees in FIG. 3F.

In the 3rd embodiment of the present disclosure, the image sensor 350 is for defining a maximum image height, the imaging lens assembly corresponds to the maximum image height for defining a relative illumination and a half field of view. When a maximum image height of the camera module 30 is ImgH, a relative illumination of imaging lens assembly is RI, a half field of view is HFOV, an optical density of main portion 362 is DM, a thickness of main portion 362 is T, a maximum extension distance of the compensation portion 363 is Lmax, a roughness of main portion 362 is RM, a roughness of transparent surface 371 is RO, and the area of the compensation portion 363 is A, the aforementioned parameters satisfy the following conditions in Table 5.

TABLE 5

| 3rd embodiment | | | |
|---|---|---|---|
| ImgH (mm) | 3.07 | DM/T ($um^{-1}$) | 1.4 |
| RI (%) | 90.3 | HFOV (degrees) | 10.15 |
| DM | 6.4 | RI × sin(HFOV) | 0.16 |
| T (um) | 4.6 | Lmax (um) | 14.4 |
| RM (um) | 0.008 | RO (um) | 0.005 |
| \|1 − RO/RM\| | 0.38 | A ($um^2$) | 3919.8 |

Furthermore, the maximum extension distance Lmax of the compensation portion 363 and the thickness T of the main portion 362 can be the extension distance L and the thickness T of any example in the 1st embodiment, but the present disclosure is not limited thereto.

4th Embodiment

Figure 4:
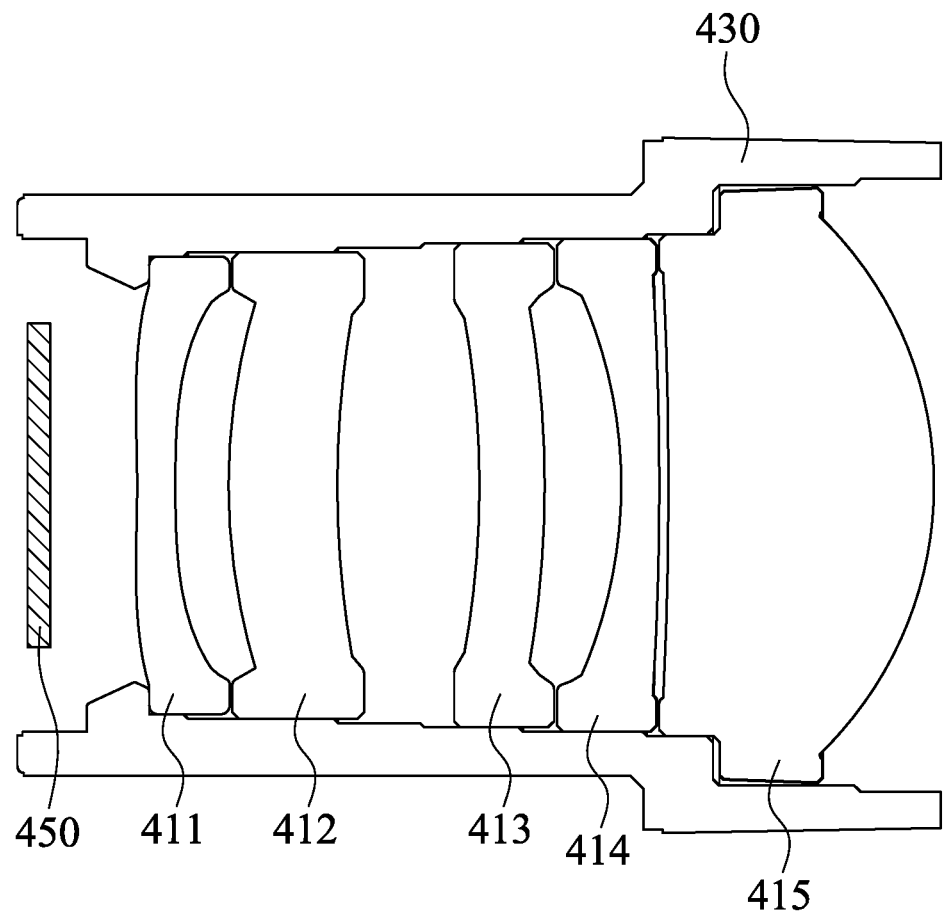
FIG. 4 is a schematic view of an imaging module according to the 4th embodiment of the present disclosure.

FIG. 4 is a schematic view of an imaging module 40 according to the 4th embodiment of the present disclosure. In FIG. 4, the imaging module 40 includes a lens assembly (its reference numeral is omitted) and an image source 450, wherein the image source 450 is disposed on an incident side of the lens assembly, and the image is projected on the projection surface (not shown) via the lens assembly.

In detail, the imaging module 40 is a single set of the lens assembly, and light from the image source 450 can be converged or diverged when entering the les assembly. The image module 40 can further include an image transmission module (not shown), and the image transmission module can be a waveguide or an optical path folding lens assembly, but the present disclosure is not limited thereto. The image source 450 can be a LCD, a DLP, a laser light source, an ultraviolet light source, or an infrared light source, and can further include optical elements, such as a lens array, an optical diffuser, a glass slide, etc., but the present disclosure is not limited thereto.

The lens assembly includes, in order from the incident side to an exit side, five lens elements 411, 412, 413, 414, 415, wherein the lens elements 411, 412, 413, 414, 415 are disposed in a carrier element 430. Moreover, the lens element 411 is a glass lens element, the lens element 413 is a plastic lens element, and the lens element 411 is closer to the image source 450 than the lens element 413 to the image source 450. Therefore, the impact of waste heat from the image source 450 on the optical character of the plastic lens element can be minimized, so that the optical quality of the lens assembly can be ensured. It should be noted that the number, the configuration, surface morphology and other optical features of the plastic lens element and the other optical elements can be arranged depend on various imaging demands, but the present disclosure is not limited thereto.

Furthermore, a light-blocking layer (not shown) is disposed on a transparent surface (its reference numeral is omitted) of the lens element 413, and the lens element 413 includes an optical effective area (its reference numeral is omitted), wherein a peripheral region (not shown) of the light-blocking layer forms a specific shape around the optical effective area so as to define an aperture region by the light-blocking layer, the aperture region corresponds to the optical effective area. In particular, the peripheral region includes a main portion (not shown), and the main portion forms the specific shape.

The transparent surface includes an annular marked structure (not shown), wherein the annular marked structure has an angle end, and the angle end surrounds the optical effective area. The optical effective area of the transparent surface is an aspheric surface, and the aspheric surface includes at least one inflection point.

Also, the configuration and arrangement of the light-blocking layer and the others corresponding elements in the 4th embodiment are the same with any of the light-blocking layer and the corresponding elements in the 1st embodiment, and will not be described again herein.

5th Embodiment

Figure 5:
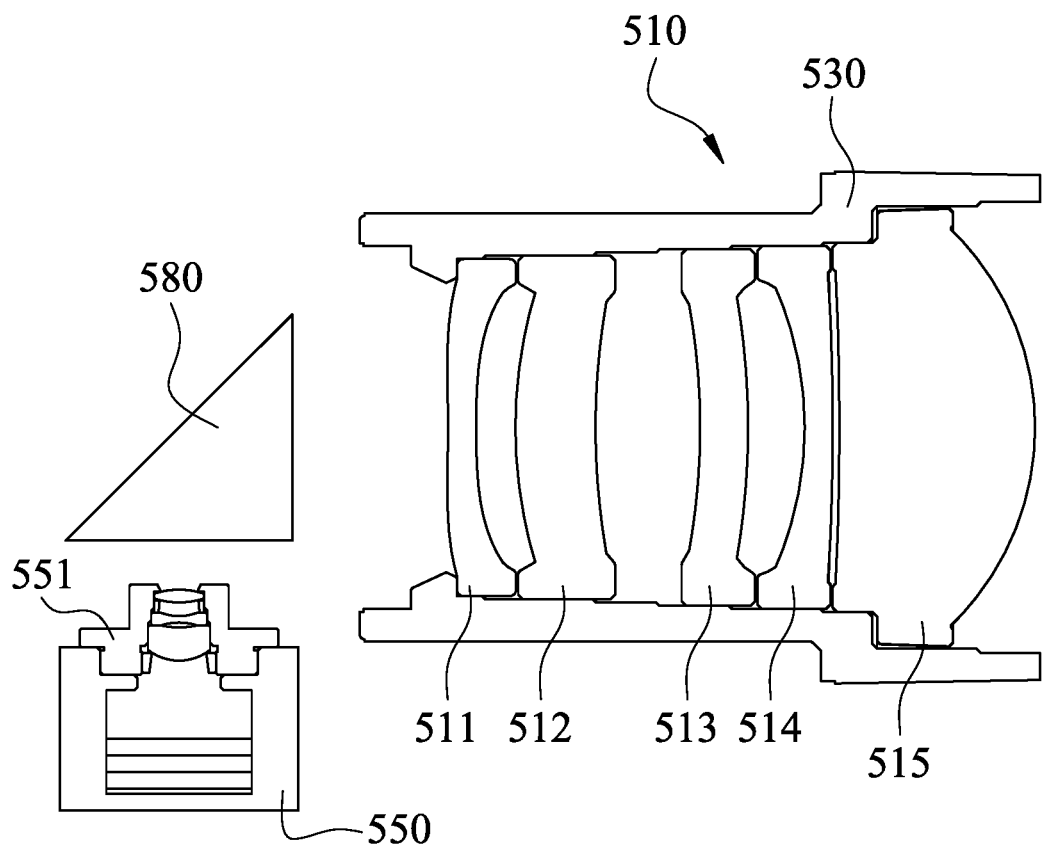
FIG. 5 is a schematic view of an imaging module according to the 5th embodiment of the present disclosure.

FIG. 5 is a schematic view of an imaging module 50 according to the 5th embodiment of the present disclosure. In FIG. 5, the imaging module 50 includes two lens assemblies 510, 551, and an image source 550, wherein the image source 550 is disposed on an incident side of the lens assembly 510, and the lens assembly 551 is for controlling the illumination range of the image source 550.

In detail, the imaging module 50 is a plurality of lens assemblies, and light from the image source 550 can be converged or diverged when entering the les assemblies. The image module 50 can further include an image transmission module (not shown), and the image transmission module can be a waveguide or an optical path folding lens assembly, but the present disclosure is not limited thereto. The image source 550 can be a LCD, a DLP, a laser light source, an ultraviolet light source, or an infrared light source, and can further include optical elements such as a lens array, an optical diffuser, a glass slide, etc., but the present disclosure is not limited thereto.

The lens assembly 510 includes, in order from the incident side to an exit side, five lens elements 511, 512, 513, 514, 515, wherein the lens elements 511, 512, 513, 514, 515 are disposed in a carrier element 530. Moreover, the lens element 511 is a glass lens element, the lens element 513 is a plastic lens element, and the lens element 511 is closer to the image source 550 than the lens element 513 to the image source 550. Therefore, the impact of waste heat from the image source 550 on the optical character of the plastic lens element can be minimized, so that the optical quality of the lens assembly can be ensured. It should be noted that the number, the configuration, surface morphology and other optical features of the plastic lens element and the other optical elements can be arranged depend on various imaging demands, but the present disclosure is not limited thereto.

The lens assembly 510 can further include a reflective element 580. In particular, the lens assembly 510 includes, in order from the incident side to the exit side, the reflective element 580, and the lens elements 511, 512, 513, 514, 515, wherein the reflective element 580 is disposed between the lens assembly 551 and the lens element 511 of the lens assembly 510. Therefore, the size of the imaging module 50 in one direction can be controlled.

Furthermore, a light-blocking layer (not shown) is disposed on a transparent surface (its reference numeral is omitted) of the lens element 513, and the lens element 513 includes an optical effective area (its reference numeral is omitted), wherein a peripheral region (not shown) of the light-blocking layer forms a specific shape around the optical effective area so as to define an aperture region by the light-blocking layer, the aperture region corresponds to the optical effective area. In particular, the peripheral region includes a main portion (not shown), and the main portion forms the specific shape.

The transparent surface includes an annular marked structure (not shown), wherein the annular marked structure has an angle end, and the angle end surrounds the optical effective area. The optical effective area of the transparent surface is an aspheric surface, and the aspheric surface includes at least one inflection point.

Also, the configuration and arrangement of the light-blocking layer and the others corresponding elements in the 5th embodiment are the same with any of the light-blocking layers and the others elements in the 1st embodiment and the 4th embodiment, and will not be described again herein.

6th Embodiment

Figure 6A:
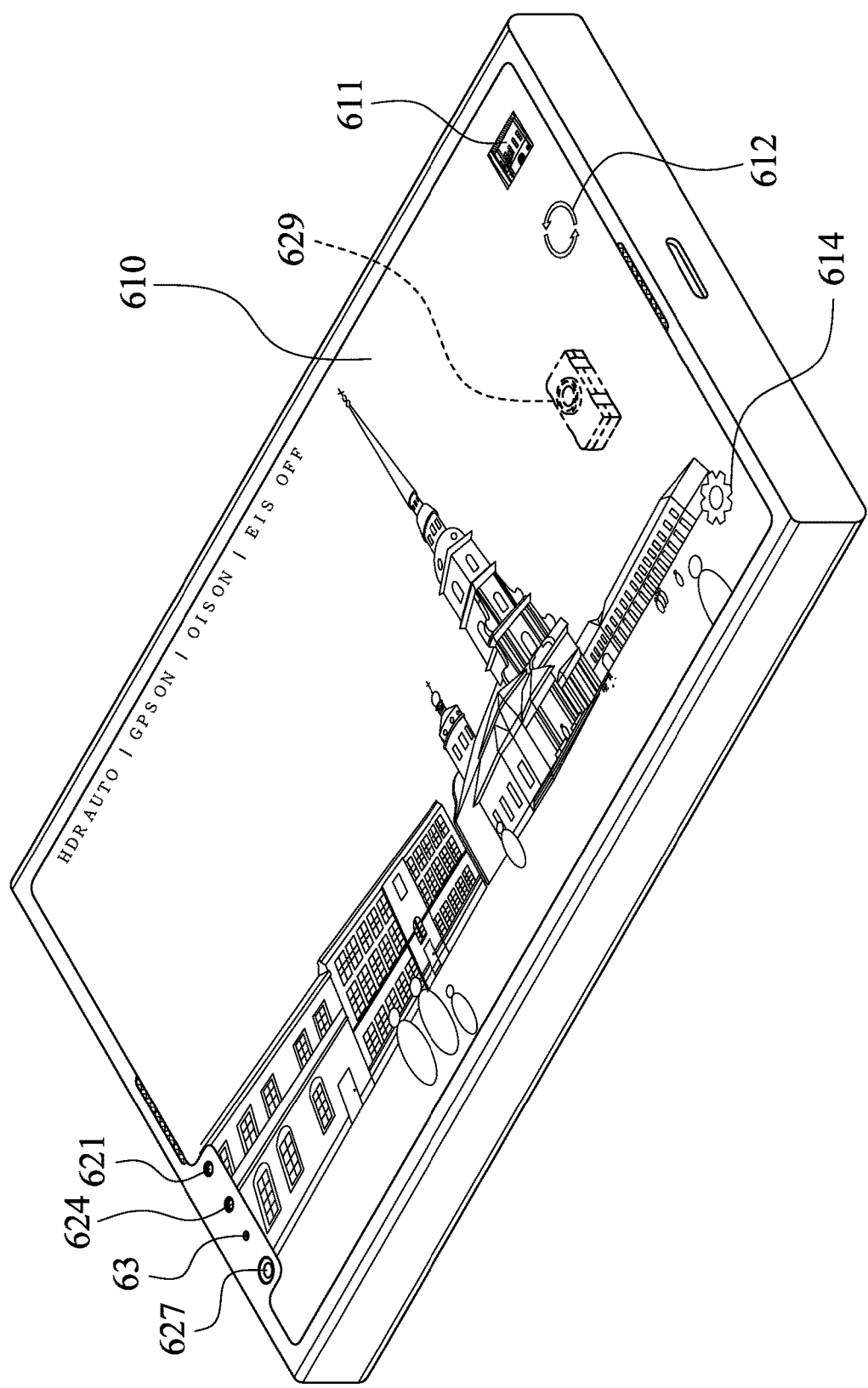
FIG. 6A is a schematic view of an electronic device according to the 6th embodiment of the present disclosure.
Figure 6B:
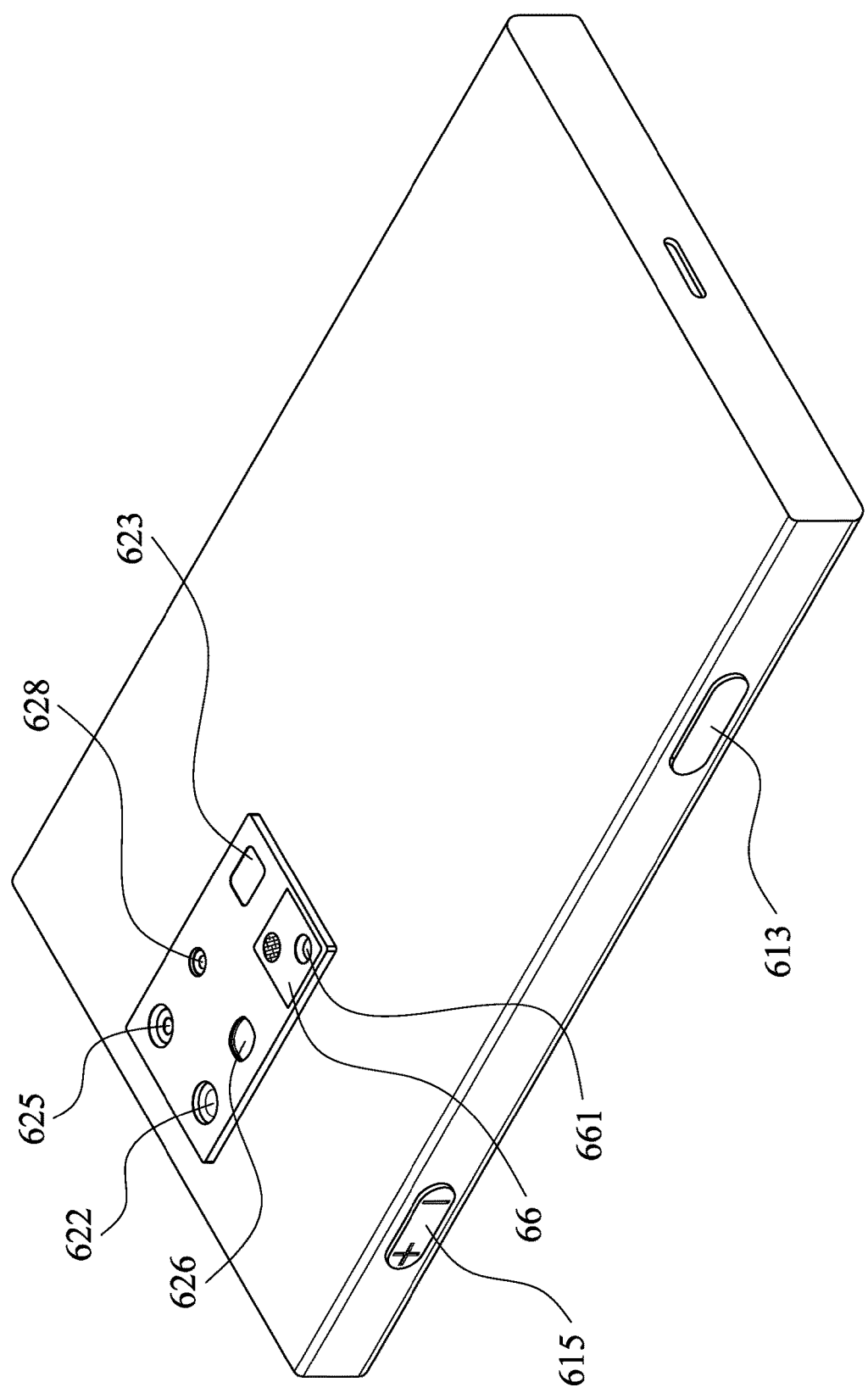
FIG. 6B is a schematic view of the electronic device according to the 6th embodiment in FIG. 6A.
Figure 6C:
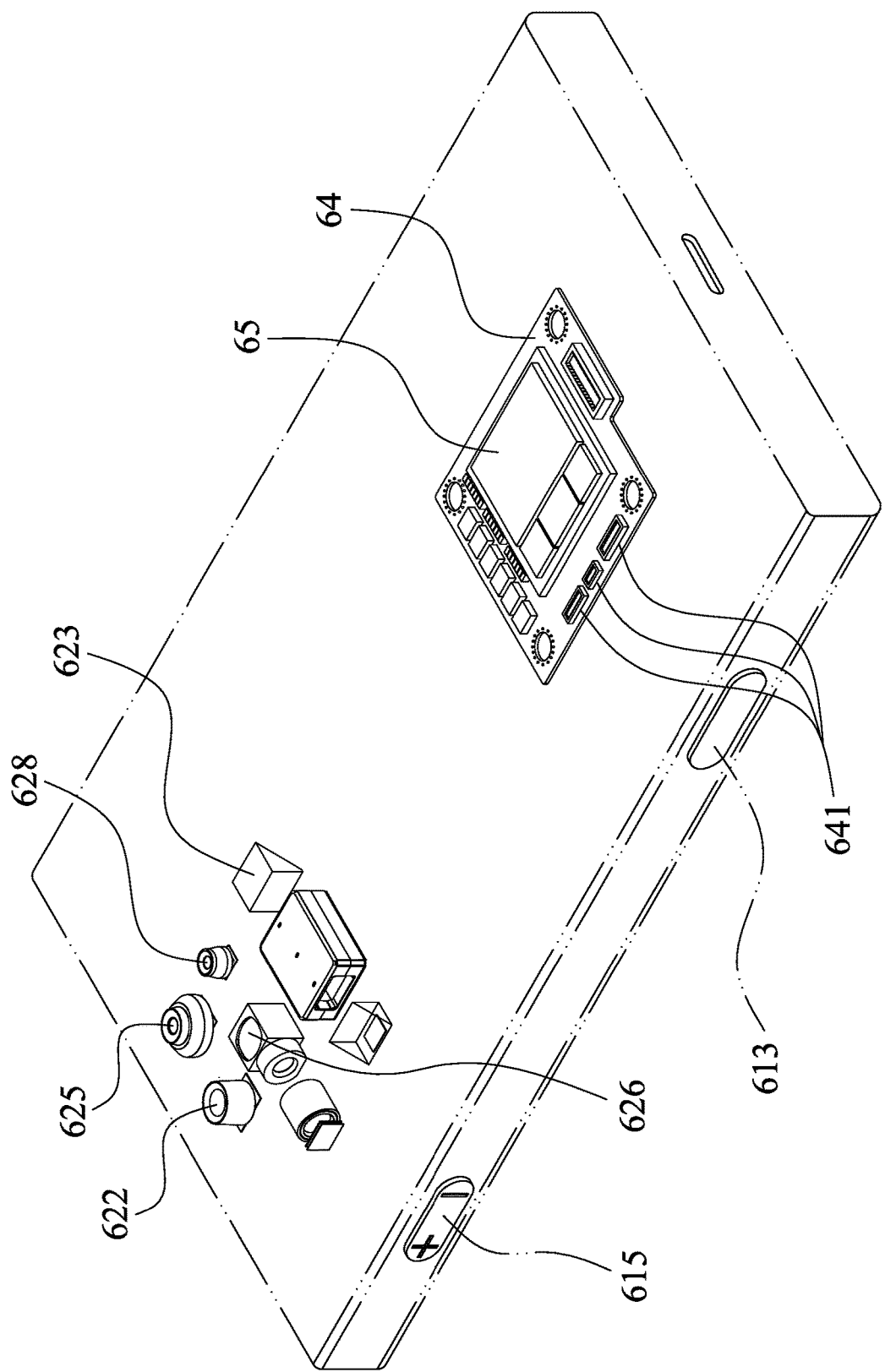
FIG. 6C is another schematic view of the electronic device according to the 6th embodiment in FIG. 6A.

FIG. 6A is a schematic view of an electronic device 60 according to the 6th embodiment of the present disclosure. FIG. 6B is a schematic view of the electronic device 60 according to the 6th embodiment in FIG. 6A. FIG. 6C is another schematic view of the electronic device 60 according to the 6th embodiment in FIG. 6A. In FIGS. 6A to 6C, the electronic device 60 is a smartphone, wherein the electronic device 60 can be a laptop, a tablet, or a driving recorder, but it is not limited thereto. The electronic device 60 includes at least one camera module, an image sensor (not shown), and an image capturing controlling interface 610, wherein the camera module includes an imaging lens assembly (not shown) and an image sensor (not shown). In particular, the camera module can be any of the aforementioned camera modules from the 1st embodiment to the 3rd embodiment, but the present disclosure is not limited thereto.

In the 6th embodiment, the electronic device 60 includes two ultra-wide camera modules 621, 622, an ultra-telephoto camera module 623, two wide-angle camera modules 624, 625, a telephoto camera module 626, a time-of-flight (TOF) module 627, a macro camera module 628, and a biometric camera module 629, wherein the TOF module 627 and the biometric camera module 629 can be other types of camera module, but the present disclosure is not limited thereto.

In detail, the ultra-wide camera module 621, the wide-angle camera module 624, the TOF module 627 and the biometric camera module 629 are disposed the front side of the electronic device 60, and the ultra-wide camera module 622, the ultra-telephoto camera module 623, the wide-angle camera module 625, the telephoto camera module 626, and the macro camera module 628 are disposed the rear side of the electronic device 60.

An image capturing control interface 610 can be a touch screen for displaying images and touch function, and be used to manually adjust the shooting angle. In detail, the image capturing control interface 610 includes a playback button 611, a camera module selector 612, a focusing shooting button 613, an integrated menu button 614, and a zoom controlling button 615. Furthermore, the user can enter the shooting mode through the image capturing control interface 610, freely switch the ultra-wide camera modules 621, 622, the ultra-telephoto camera module 623, the wide-angle camera modules 624, 625, the telephoto camera module 626, the TOF module 627, and the macro camera module 628 through the camera module selector 612 for shooting, the zoom controlling button 615 can be for adjusting the zooming, the images can be captured through the focusing shooting button 613 after ensuring the scene and one of the ultra-wide camera modules 621, 622, the ultra-telephoto camera module 623, the wide-angle camera modules 624, 625, the telephoto camera module 626, the TOF module 627, and the macro camera module 628. The user can check the images through the playback button 611 after capturing the images, and the integrated menu button 614 can be for adjusting the shooting setup details (such as, timed shooting, photo ratio, etc.).

The electronic device 60 can further include a reminder light 63, and the reminder light 63 is disposed on the front side of the electronic device 60 for reminding the user about their unread messages, missed calls, and phone status.

Furthermore, after entering the shooting mode through the image capturing control interface 610 of the electronic device 60, the camera module can converge the imaging light on the image sensor, and output the electronic signal related to the images to the image signal processor (its reference numeral is omitted) of a system-on-a-chip (SoC) 65, wherein the SoC 65 can further include a random access memory (RAM), a central processing unit, and a storage unit, and further include but not limited to a display unit, a control unit, a read-only storage unit (ROM), or a combination thereof.

The electronic device 60 can further include an optical image stabilization component (not shown) and an image software processor (not shown) so as to adapt to the camera specification on the electronic device 60. Furthermore, the electronic device 60 can further include at least one focus assisting element 66 and at least one sensing element (not shown). The focus assisting element 66 can include a light-emitting element 661 for color temperature compensation, an infrared ranging element not shown), a laser focusing module (not shown), etc. The sensing element can have the function of sensing physical momentum and actuation energy, such as an accelerometer, a gyroscope, a Hall effect element, a position locator, a signal transmission module, to sense the shaking imposed by the user's hand or the external environment, and further ensure the performance of an auto-focusing function and the optical image stabilization component so as to obtain the excellent imaging quality. Therefore, the electronic device 60 of the present disclosure has multiple modes for shooting function, such as optimized selfie, low-light high dynamic range (HDR), high-resolution 4K (4K resolution) video recording, etc. Moreover, the users can visually see a captured image of the camera and manually operate the view finding range on the image capturing control interface 610 so as to achieve the autofocus function of what you see is what you get.

Furthermore, the camera module, the image sensor, the optical image stabilization component, the sensor element and the focus assisting element 66 can be disposed on a circuit board 64, and are electrically connected to the related elements such as the image signal processor through the connector 641 to execute the shooting process, wherein the circuit board can be a flexible printed circuit board (FPC). The current electronic devices, such as smartphones, have a trend of being thin and light. The camera module and related components are disposed on the circuit board, and the circuit is integrated into the main board of the electronic device by using a connector, which can meet the limited internal space design and the circuit layout requirements of the electronic device so as to attain more significant margins and make the auto-focusing function of the camera module be controlled more flexibly through the touch screen of the electronic device as well. In the 6th embodiment, the sensing element and the focus assisting element 66 are disposed on the FPC (not shown), and are electrically connected to the related elements such as the imaging signal processing element through corresponding connectors to execute the shooting process. In other embodiments (not shown), the sensing element and the optical assisting element can be disposed on the main board of the electronic device or other types of board depended on the circuit arrangement requirements and the configuration design.

Figure 6D:
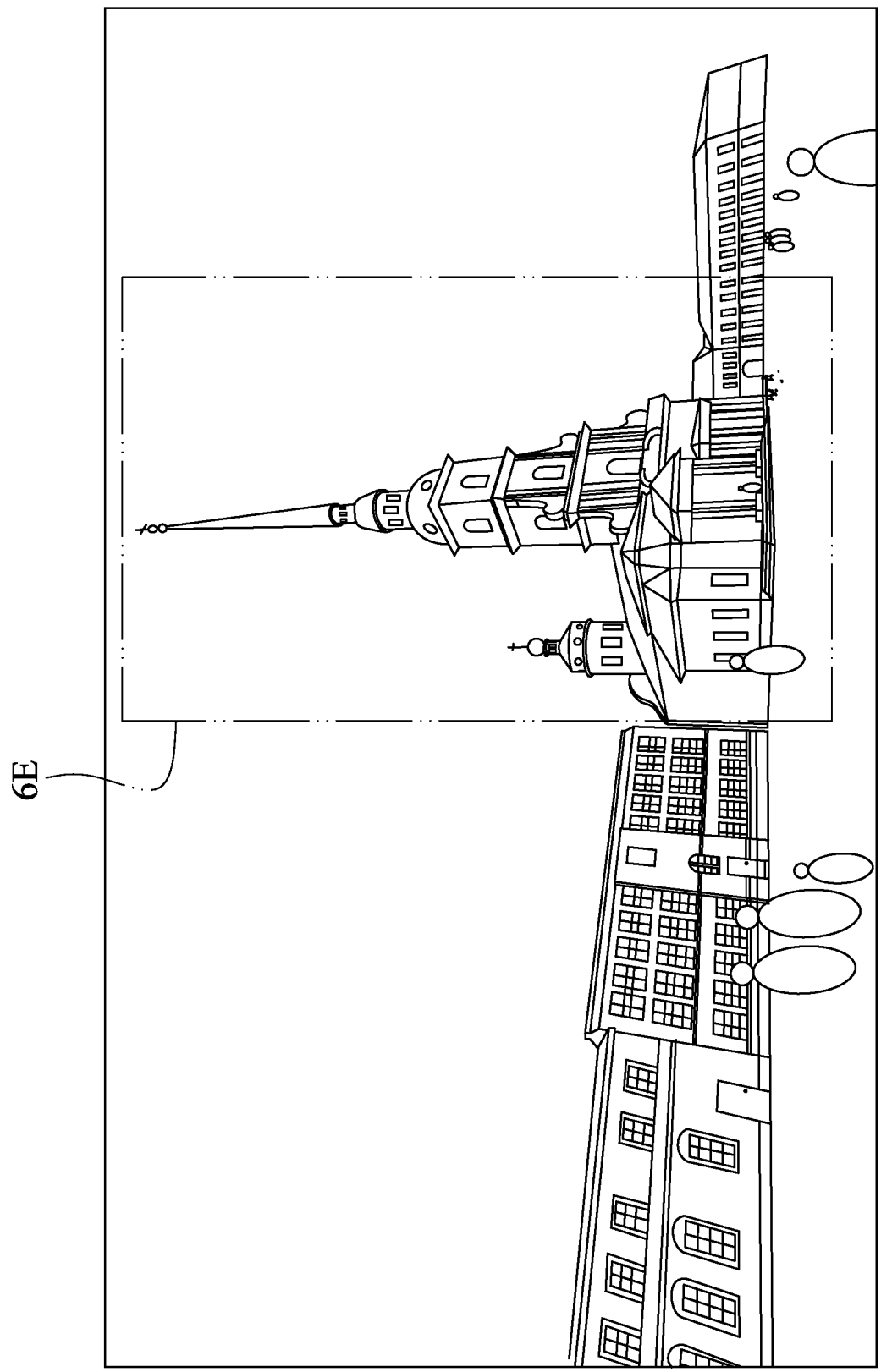
FIG. 6D is an image schematic view of the electronic device according to the 6th embodiment in FIG. 6A.

FIG. 6D is an image schematic view of the electronic device 60 according to the 6th embodiment in FIG. 6A. In FIG. 6D, the imaging result of the ultra-wide camera modules 621, 622 can have greater field of view and depth of field than the imaging result of the wide-angle camera modules 624, 625, but it comes with greater distortion as well. In particular, the field of view in FIG. 6D is 105 degrees-125 degrees, and the equivalent focal length is 11 mm-14 mm.

Figure 6E:
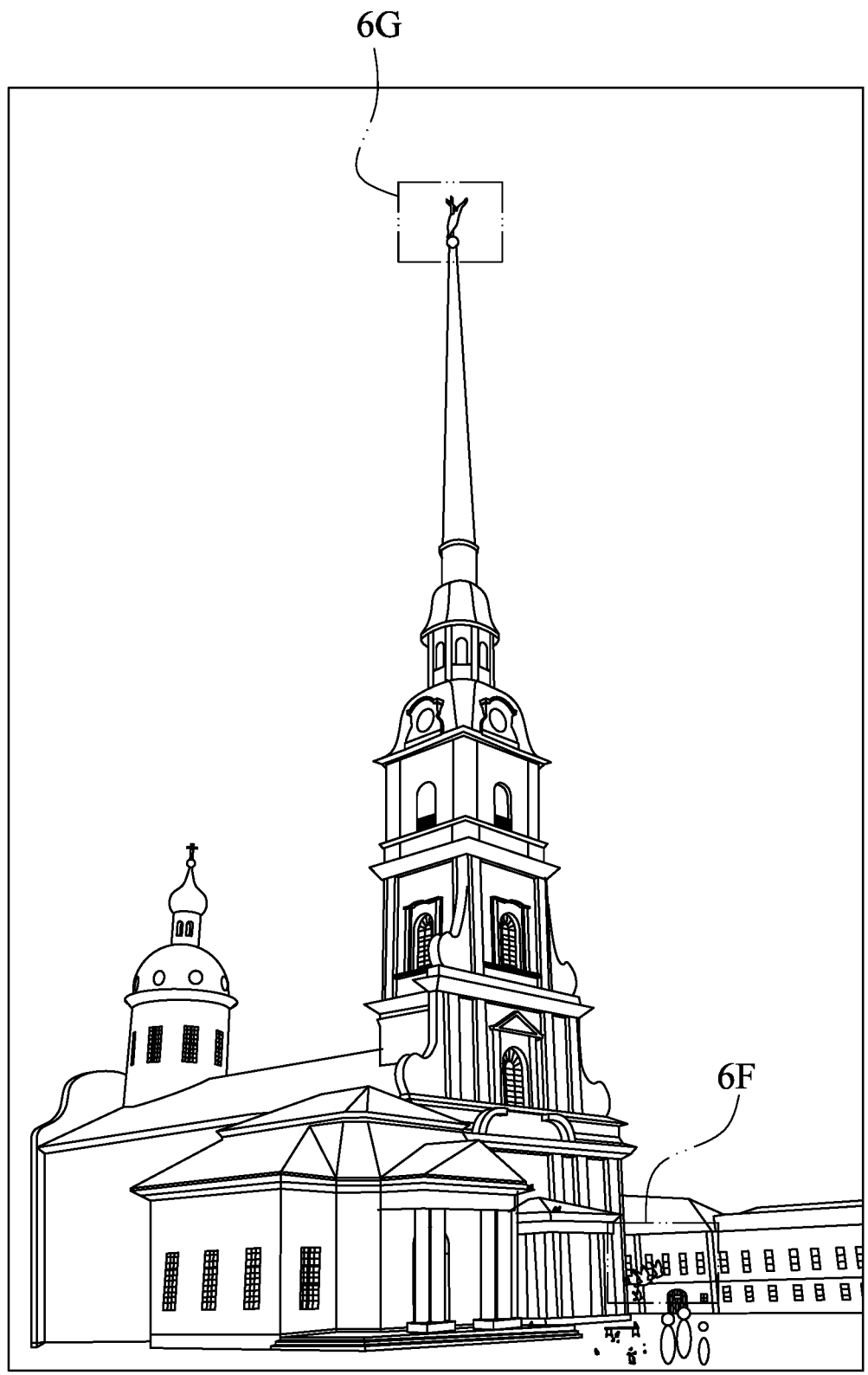
FIG. 6E is another image schematic view of the electronic device according to the 6th embodiment in FIG. 6A.

FIG. 6E is another image schematic view of the electronic device 60 according to the 6th embodiment in FIG. 6A. In FIG. 6E, using the wide-angle camera modules 624, 625 can shoot high-resolution images within certain range, and have a high-resolution and low-distortion function. In particular, FIG. 6E is a partial enlarged view of FIG. 6D, the field of view in FIG. 6E is 70 degrees-90 degrees, and the equivalent focal length in FIG. 6E is 22 mm-30 mm.

Figure 6F:
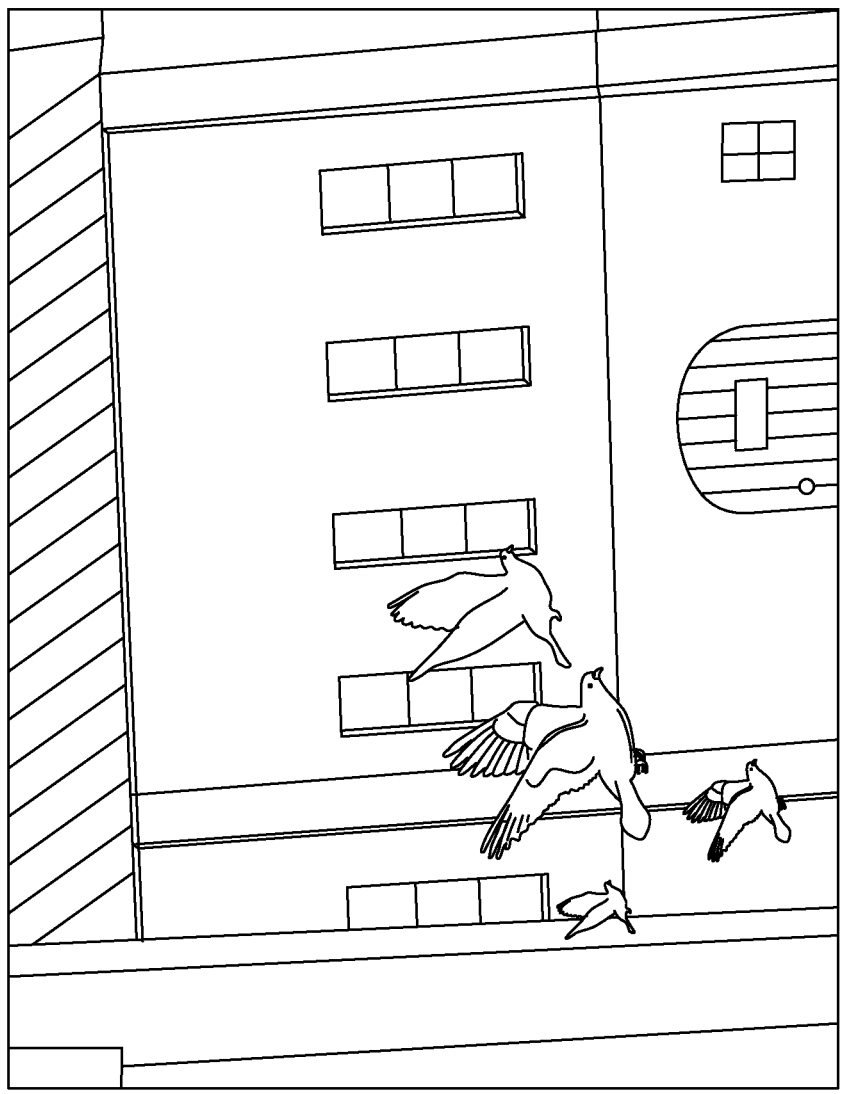
FIG. 6F is another image schematic view of the electronic device according to the 6th embodiment in FIG. 6A.

FIG. 6F is another image schematic view of the electronic device 60 according to the 6th embodiment in FIG. 6A. In FIG. 6F, the imaging result of the telephoto camera module 626 can have smaller field of view and depth of field than the imaging result of the wide-angle camera modules 624, 625, which is favorable for capturing dynamic objects. That is, an actuator (not shown) of the electronic device 60 can drive the telephoto camera module 626 to rapidly and continuously auto-focus on the objects, so that the objects are not blurred due to being away from the focus position. In particular, FIG. 6F is a partial enlarged view of FIG. 6E, the field of view in FIG. 6F is 10 degrees-40 degrees, and the equivalent focal length in FIG. 6F is 60 mm-300 mm.

Figure 6G:
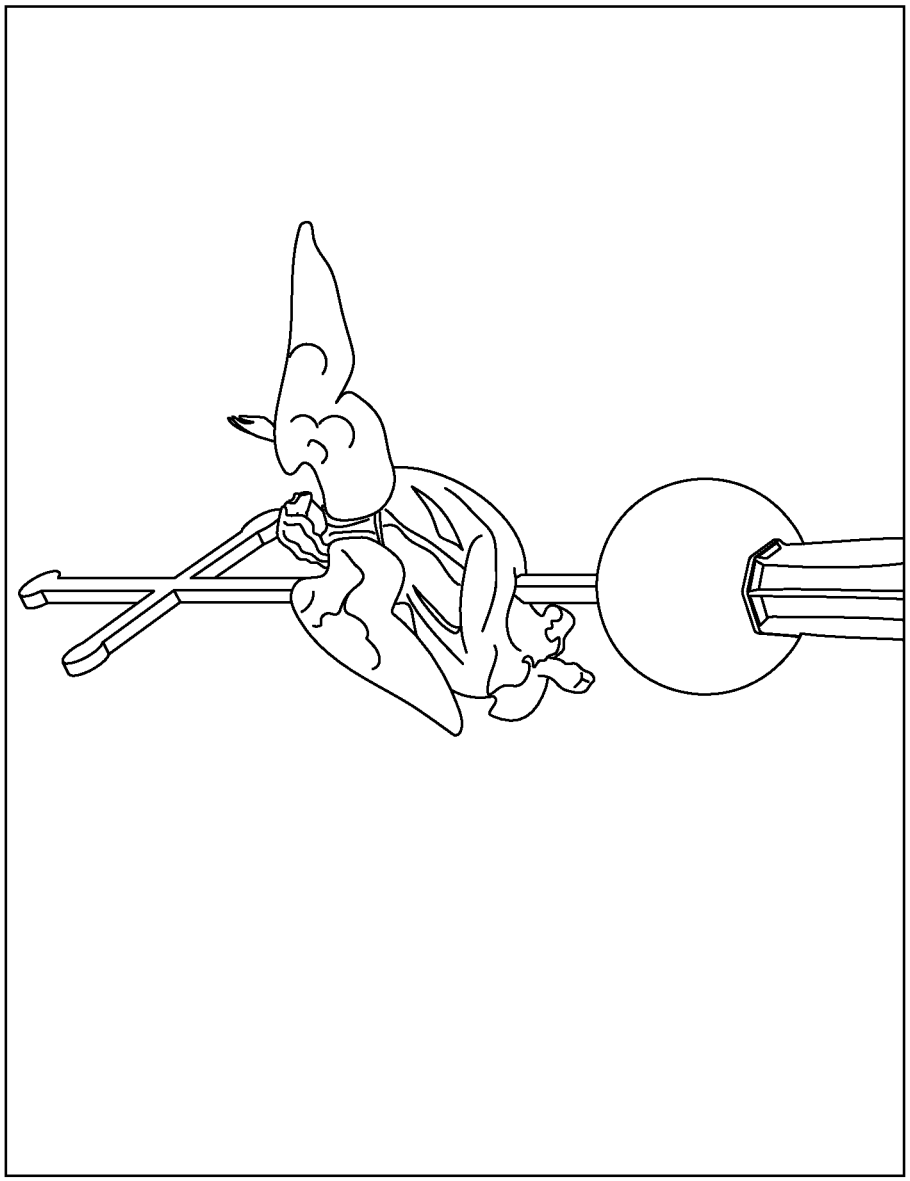
FIG. 6G is another image schematic view of the electronic device according to the 6th embodiment in FIG. 6A.

FIG. 6G is another image schematic view of the electronic device 60 according to the 6th embodiment in FIG. 6A. In FIG. 6G, the imaging result of the ultra-telephoto camera module 623 can have much smaller field of view and depth of field than the imaging result of the telephoto camera module 626, so that the ultra-telephoto camera module 623 tends to defocus because of shaking. Therefore, the actuator provides driving force to enable the ultra-telephoto camera module 623 to focus on the objects, and provides a feedback force for correcting the vibration to achieve the effect of optical anti-shake. In particular, FIG. 6G is a partial enlarged view of FIG. 6E, the field of view in FIG. 6G is 4 degrees-8 degrees, and the equivalent focal length in FIG. 6F is 400 mm-600 mm.

In FIGS. 6D to 6G, image capturing through the camera modules with different focal lengths and combined with an image processing technology, the electronic device 60 can realize the zoom function. It should be noted that the equivalent focal length is an estimated value after conversion, and an actual focal length may be different due to a combination design of the camera module and a size of the electronic photo sensing elements.

7th Embodiment

Figure 7A:
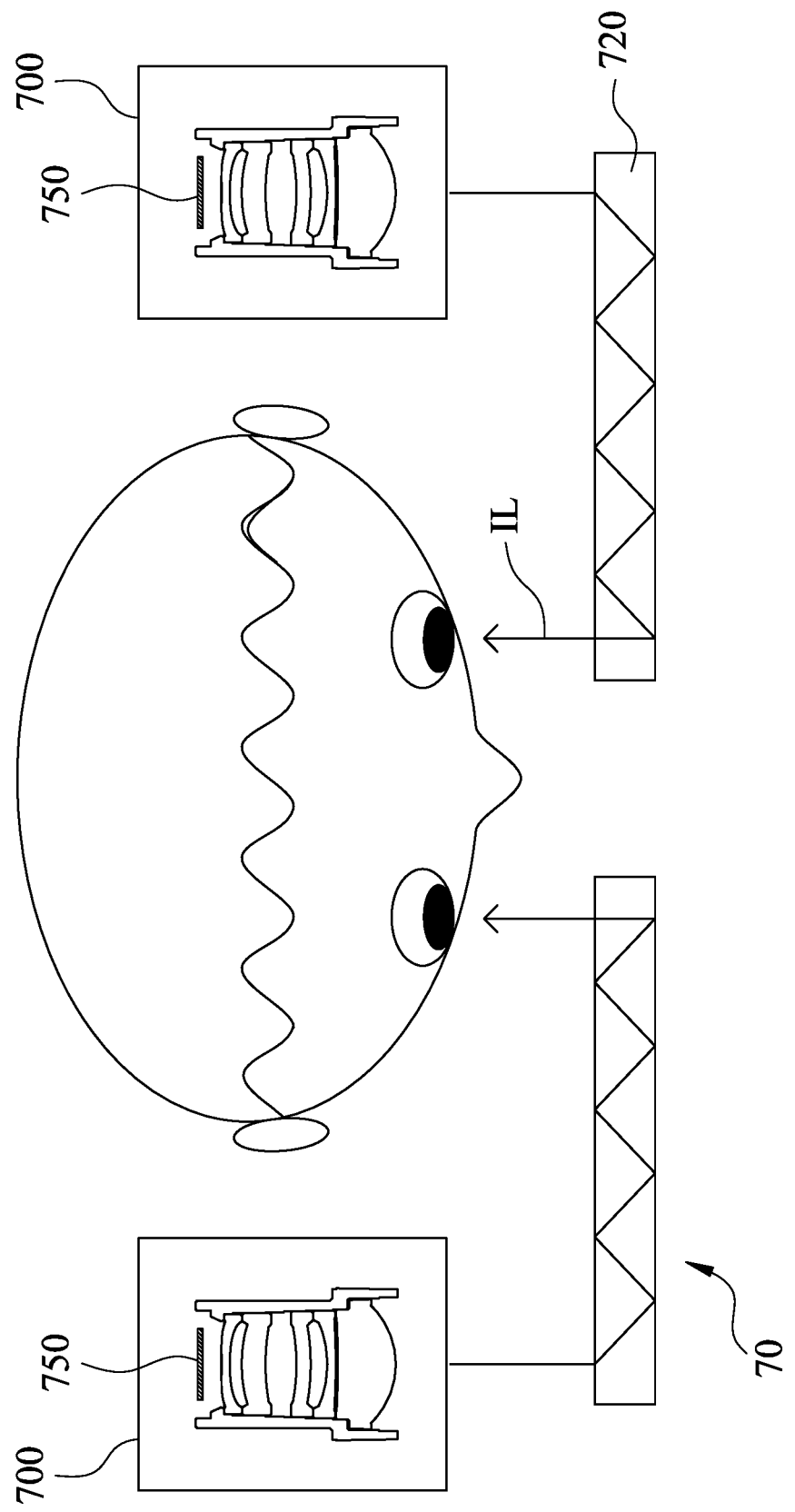
FIG. 7A is an application schematic view of the electronic device according to the 7th embodiment of the present disclosure.
Figure 7B:
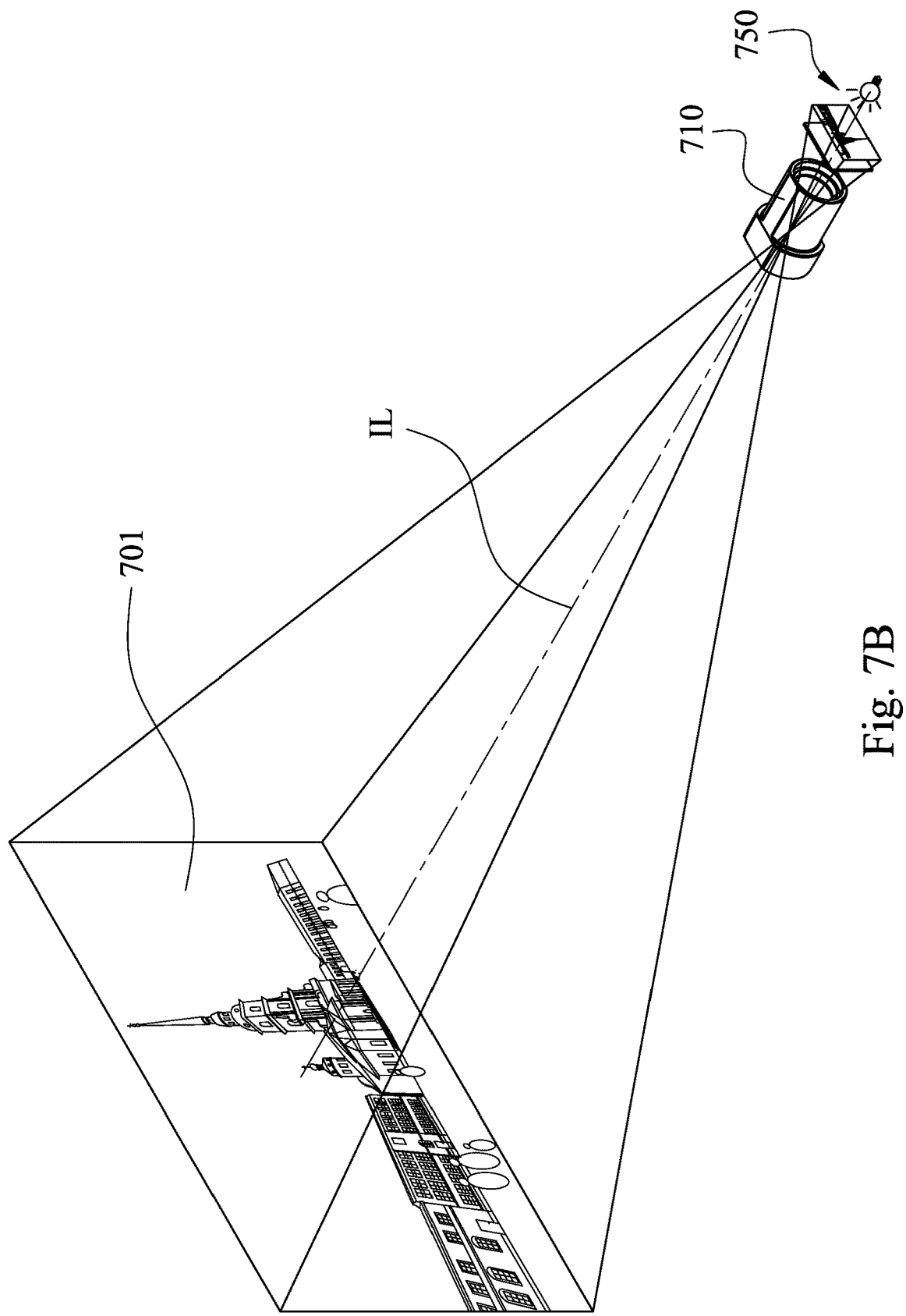
FIG. 7B is a projection schematic view of the electronic device according to the 7th embodiment in FIG. 7A.

FIG. 7A is an application schematic view of an electronic device 70 according to the 7th embodiment of the present disclosure. FIG. 7B is a projection schematic view of the electronic device 70 according to the 7th embodiment in FIG. 7A. In FIGS. 7A and 7B, the electronic device 70 is a head-mounted device, wherein the head-mounted device can be an augmented reality (AR) module or a virtual reality (VR) module. Furthermore, the head-mounted device can also be a projection module, an optical radar (Lidar) module, etc., but the present disclosure is not limited thereto. Therefore, the resolution of the projected graphics can be improved.

The electronic device 70 includes two imaging modules 700, wherein each of the imaging modules 700 includes an image transmission module 720, a lens assembly 710, and an image source 750. In particular, the image modules 700 can be the aforementioned image modules in the 4th embodiment and the 5th embodiment, the image transmission module 720 can be a waveguide, and the lens assembly 710 can be a projection lens assembly, but the present disclosure is not limited thereto.

Each of the imaging modules 700 can be a lens assembly or a plurality of lens assemblies. Light from the image source 750 can be converged or diverged on the projection surface 701 when entering the les assembly. The image source 750 can further include optical elements such as a lens array, an optical diffuser, a glass slide, etc., but the present disclosure is not limited thereto.

Moreover, the image transmission module 720 is disposed on an incident side of each of the imaging modules 700, and through the configuration of the image transmission module 720, a light path of an imaging light IL of the image source 750 can be folded and transmitted to the user's eyes.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:
1. A camera module, comprising:
an imaging lens assembly, comprising:
　a plastic optical element, a light-blocking layer disposed on a transparent surface of the plastic optical element, the plastic optical element comprising an optical effective area, a peripheral region of the light-blocking layer forming a specific shape around the optical effective area so as to define an aperture region by the light-blocking layer, the aperture region corresponding to the optical effective area, wherein the peripheral region comprises:
　　a main portion physically contacted with the transparent surface; and
　　a compensation portion disposed on an edge of the main portion adjacent to the optical effective area, wherein the compensation portion is closer to the optical effective area than the main portion to the optical effective area, the compensation portion extends toward a direction close to the optical effective area, and an optical density of the compensation portion is lower than an optical density of the main portion; and
an image sensor disposed on an image side of the imaging lens assembly for defining a maximum image height, and the imaging lens assembly corresponding to the maximum image height for defining a relative illumination;
wherein a roughness of the transparent surface is RO, which is equal to or less than 1.2 um;
wherein the transparent surface comprises an annular marked structure, the annular marked structure has an angle end, and the angle end surrounds the optical effective area;
wherein the relative illumination of the imaging lens assembly is RI, the optical density of the main portion is DM, a thickness of the main portion is T, an extension distance of the compensation portion is L, and the following conditions are satisfied:
-LOG (RI)/DM ≤ 1.2;
3 degrees ≤ $\tan^{-1}$ (T/L) ≤ 89.5 degrees;
0.7 $um^{-1}$ ≤ DM/T ≤ 7.2 $um^{-1}$; and
0 um < L ≤ 32 um.

2. The camera module of claim 1, wherein the imaging lens assembly corresponding to the maximum image height is for defining a half field of view, the half field of view is HFOV, the relative illumination of the imaging lens assembly is RI, and the following condition is satisfied:

0.04 ≤ RI x sin (HFOV) ≤ 0.35.

3. The camera module of claim 1, wherein the thickness of the main portion is T, and the following condition is satisfied:

0.14 um ≤ T ≤ 9.85 um.

4. The camera module of claim 3, wherein the thickness of the main portion is T, and the following condition is satisfied:

0.28 um ≤ T ≤ 4.95 um.

5. The camera module of claim 4, wherein the thickness of the main portion is T, and the following condition is satisfied:

0.48 um ≤ T ≤ 1.95 um.

6. The camera module of claim 1, wherein the extension distance of the compensation portion is L, and the following condition is satisfied:

0 um < L ≤ 16 um.

7. The camera module of claim 6, wherein the extension distance of the compensation portion is L, and the following condition is satisfied:

0 um < L ≤ 7 um.

8. The camera module of claim 1, wherein the optical density of the main portion is DM, the thickness of the main portion is T, and the following condition is satisfied:

1.6 um$^{-1}$ ≤ DM/T ≤ 1.95 um$^{-1}$.

9. The camera module of claim 1, wherein the roughness of the transparent surface is RO, a roughness of the main portion is RM, and the following condition is satisfied:

0 ≤ | 1-RO/RM | ≤ 0.6.

10. The camera module of claim 1, wherein the plastic optical element is a plastic lens element, the plastic lens element comprises an aspheric surface, and the aspheric surface corresponds to the optical effective area.

11. The camera module of claim 1, wherein the plastic optical element is a plastic reflective element, the plastic reflective element comprises at least one reflective surface, and the at least one reflective surface and the optical effective area are disposed on the same light path.

12. An electronic device, comprising: at least one of the camera module of claim 1.

* * * * *